(12) United States Patent
Willard et al.

(10) Patent No.: US 9,546,458 B1
(45) Date of Patent: Jan. 17, 2017

(54) DEVICE FOR RESISTING LIFTING OF A GANGWAY AND GANGWAY FITTED WITH SUCH DEVICE

(71) Applicant: SAM CARBIS ASSET MANAGEMENT, LLC, Florence, SC (US)

(72) Inventors: Ronald D. Willard, Little River, SC (US); Matthew S. Elvington, Lake View, SC (US)

(73) Assignee: SAM CARBIS ASSET MANAGEMENT, LLC, Florence, SC (US)

( * ) Notice: Subject to any disclaimer, the term of this patent is extended or adjusted under 35 U.S.C. 154(b) by 0 days.

(21) Appl. No.: 15/143,787

(22) Filed: May 2, 2016

Related U.S. Application Data

(63) Continuation-in-part of application No. 14/738,040, filed on Jun. 12, 2015.

(51) Int. Cl.
  *E01D 15/00* (2006.01)
  *E01D 15/02* (2006.01)
  *E01D 19/04* (2006.01)

(52) U.S. Cl.
  CPC .............. *E01D 15/02* (2013.01); *E01D 19/04* (2013.01)

(58) Field of Classification Search
  CPC .......... B65G 69/22; E01D 15/02; E01D 19/04
  USPC ....... 14/36, 69.5, 71.3; 182/63.1, 64.1, 68.1, 182/131, 141
  See application file for complete search history.

(56) References Cited

U.S. PATENT DOCUMENTS

| | | | |
|---|---|---|---|
| 4,679,657 A | 7/1987 | Bennett et al. | |
| 5,392,878 A | 2/1995 | Bennett et al. | |
| 6,678,910 B2 | 1/2004 | Smith | |
| 7,140,467 B2 | 11/2006 | Cook | |
| 7,216,741 B2 | 5/2007 | MacDonald et al. | |
| 7,350,254 B2* | 4/2008 | Boulton | E01D 15/124 14/2.4 |
| 7,810,198 B2* | 10/2010 | Sahr | A61G 3/06 14/69.5 |
| 7,950,095 B2* | 5/2011 | Honeycutt | B21D 5/00 14/69.5 |
| 8,015,647 B2 | 9/2011 | Bennett | |
| 8,403,109 B2 | 3/2013 | Bennett | |
| 8,479,884 B2 | 7/2013 | Mizell et al. | |
| 8,561,239 B2 | 10/2013 | Honeycutt et al. | |
| 8,745,799 B1* | 6/2014 | Thomasson | B65G 69/22 14/31 |
| 8,806,690 B1* | 8/2014 | Keith | B64F 1/3055 114/362 |

(Continued)

OTHER PUBLICATIONS

Sam Carbis Solutions Group, LLC, Instruction Manual for Pneumatically Operated Raise/Lower TCG Gangway, Published 2013, Revised Nov. 14, 2014.

*Primary Examiner* — Raymond W Addie
(74) *Attorney, Agent, or Firm* — Dority & Manning, P.A.

(57) ABSTRACT

A sprung gangway that is counterbalanced to remain in a given degree of extension or retraction includes a lifting resistance device that includes a linear index rail that slides selectively into and out of a hollow sheath unless engaged by a locking paw that is pivotally mounted to the sheath via a pivot bar, which when pivoted by tugging on a release cord effects disengagement of the locking paw and thereby permits raising of the gangway from the lowered working orientation to a storage orientation.

20 Claims, 14 Drawing Sheets

(56) References Cited

U.S. PATENT DOCUMENTS

2011/0011678 A1\* 1/2011 Sheffield .................. E04G 1/24
182/141

\* cited by examiner

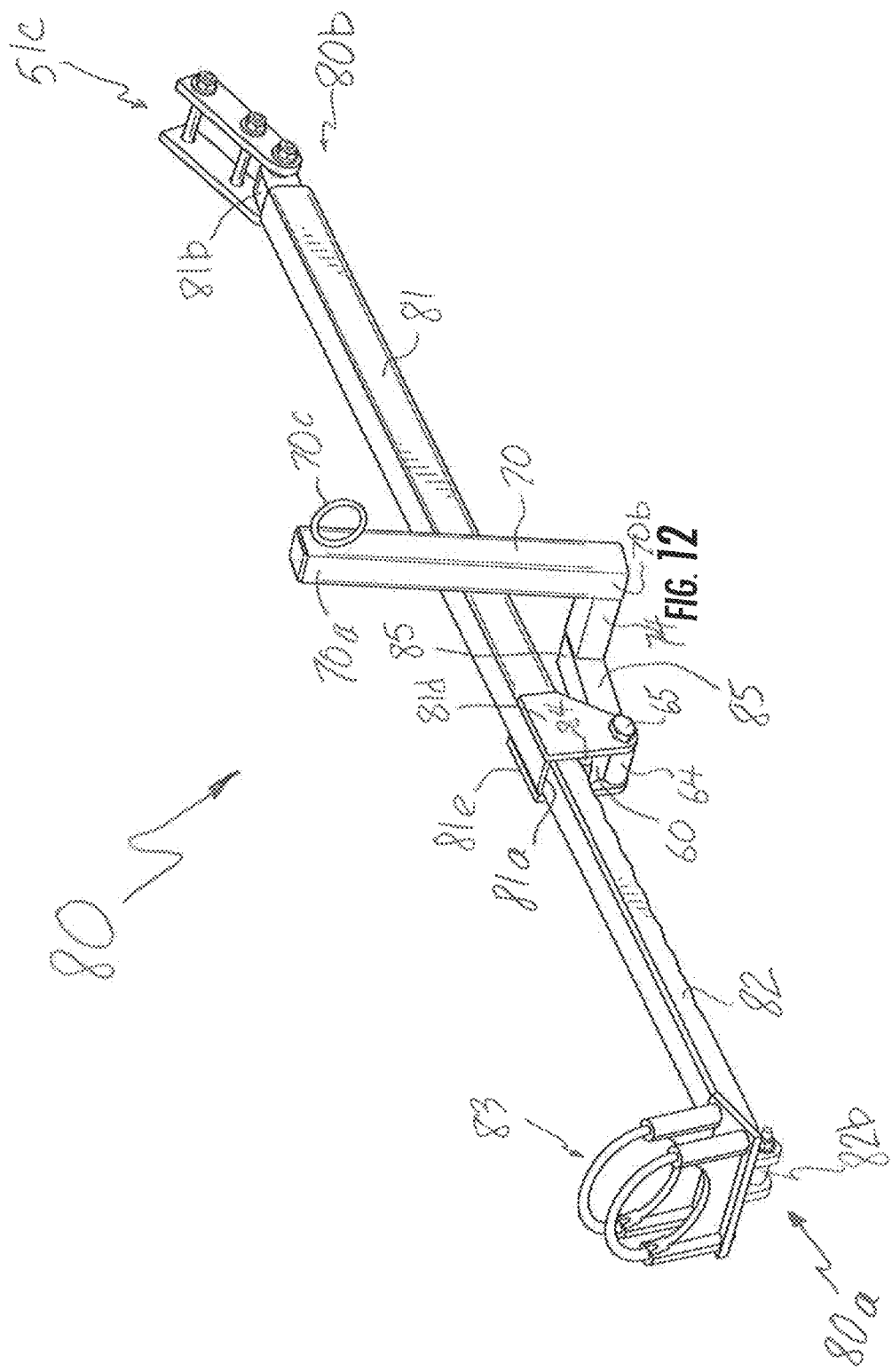

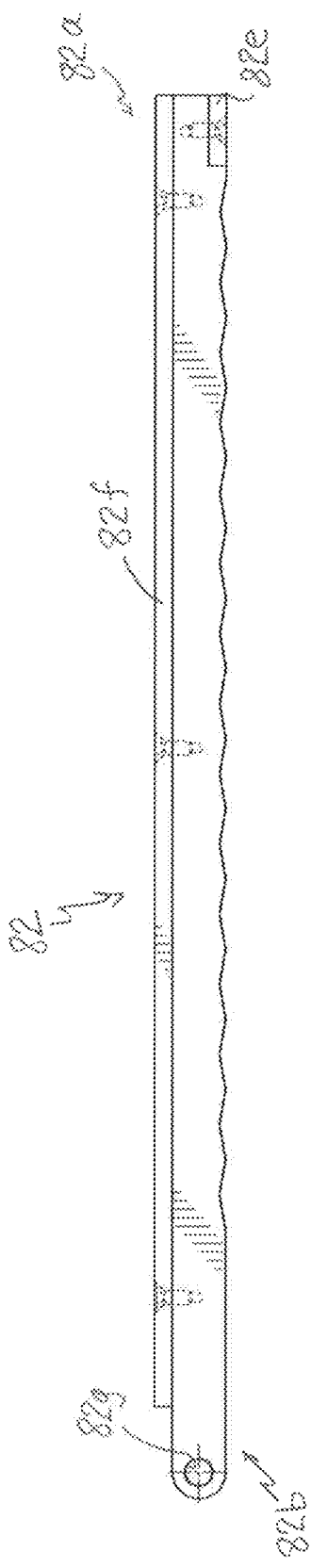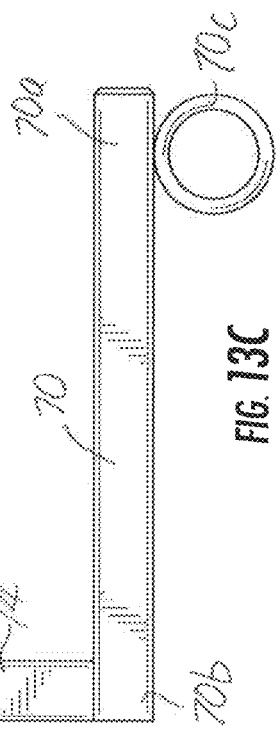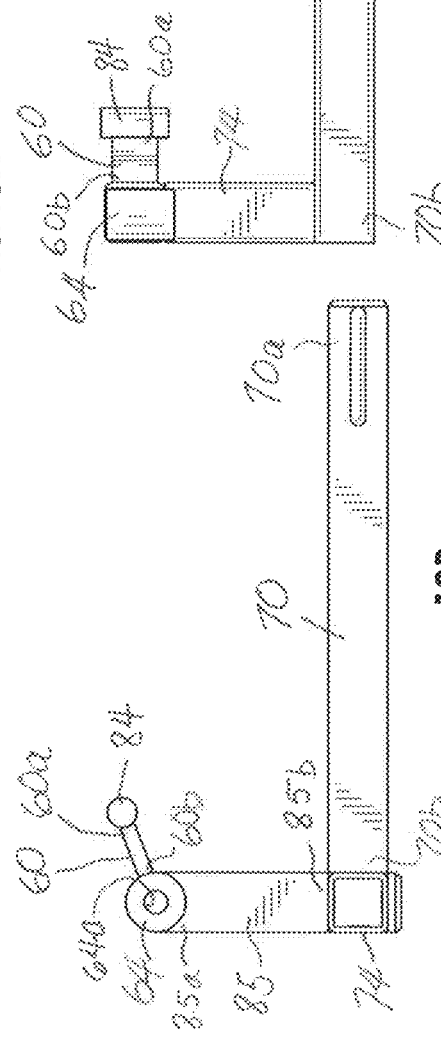

DEVICE FOR RESISTING LIFTING OF A GANGWAY AND GANGWAY FITTED WITH SUCH DEVICE

CROSS-REFERENCE TO RELATED APPLICATIONS

The present application claims priority benefit to and is a continuation-in-part application to patent application Ser. No. 14/738,040, filed on Jun. 12, 2015, which is hereby incorporated herein in its entirety by this reference for all purposes.

STATEMENT REGARDING FEDERALLY SPONSORED RESEARCH OR DEVELOPMENT

Not applicable.

FIELD OF THE INVENTION

The subject matter disclosed herein generally involves fall protection equipment for accessing the tops of rolling stock, and particularly a so-called sprung gangway that can be deployed from one end of an elevated loading platform down onto the tops of rolling stock.

BACKGROUND OF THE INVENTION

In accessing the tops of rolling stock (tank trucks, tank railroad cars, etc.), a gangway or bridge is used to allow workers to move from an elevated loading platform to the top of the rolling stock. Such a gangway often includes self-leveling steps and is pivotally mounted to a platform that is disposed above the top of the rolling stock. In one type of these gangways such as disclosed in U.S. Pat. No. 7,140,467, which is hereby incorporated herein in its entirety by this reference for all purposes, the gangway is a retractable stairway 26 that has a retracted disposition in which the free end, i. e., the distal end, of the stairway is stored in a position that resides above the walking surface of the floor 22 to which the gangway is pivotally mounted. This retractable stairway 26 can include an adjustable chain stop 27 that is configured and disposed so as to limit downward swinging movement of the stairway 26.

In gangways that are disclosed in U.S. Pat. Nos. 4,679,657 and 7,216,741, which patents are hereby incorporated herein in their entirety by this reference for all purposes, the gangway can be moved pivotally like a drawbridge between a relatively elevated stowed orientation with respect to the top of rolling stock and a relatively lowered operative orientation with respect to the top of rolling stock. These gangways can include expansion springs or hydraulic actuators that are interconnected so as to bias or counterbalance the gangway to remain in any given orientation, for example the relatively elevated stowed orientation, and the user can push against this biasing or counterbalancing force to dispose the gangway in a different orientation, for example the relatively lowered operative orientation that leads to the top of the rolling stock. In such embodiments, the expansion springs and/or hydraulic actuators serve to counterbalance the weight of the gangway and so enable an individual user to move the gangway between the lowered operative orientation and the elevated stowed orientation by the exertion of a reasonable level of manual force by a typical individual user.

In gangways that are disclosed in U.S. Pat. Nos. 8,015,647 and 8,403,109, which patents are hereby incorporated herein in their entirety by this reference for all purposes, the gangway can be held in the lowered operative orientation by extending the piston rods from within actuating cylinders that force the gangway downward by overcoming the biasing force of expansion springs. However, such actuating cylinders are an added expense in themselves as well as introducing the further complexity and expense of providing the pressurized fluid and associated motors, compressor, valves and controls and that are necessary to the actuate the cylinders in order to operate them. This patent also discloses a foot-activated lock that can be engaged so as to restrain the gangway in the lowered orientation. This foot-activated lock is disposed near the walking surface of the platform from which the gangway is pivotally attached. Unfortunately, the heavy foot traffic of workers between the platform and the gangway can result in an inadvertent deactivation of the lock, and once the lock is deactivated the gangway 30 can be moved away from the top of the rolling stock and expose workers remaining on the rolling stock to a risk of falling if they are unaware of the removal of the gangway.

BRIEF DESCRIPTION OF THE DRAWINGS

Aspects and advantages of the invention are set forth below in the following description, or may be obvious from the description, or may be learned through practice of embodiments of the invention. Those of ordinary skill in the art will better appreciate the features and aspects of such embodiments, and others, upon review of the specification. A full and enabling disclosure of the present invention, including the best mode thereof to one skilled in the art, is set forth more particularly in this specification, including reference to the accompanying figures, in which:

FIG. 12 is an elevated perspective view of a presently preferred embodiment of a lifting resistance device for a gangway.

FIG. 13A is a side plan view of an embodiment of a linear index rail of a lifting resistance device.

FIG. 13B is a side plan view of an embodiment of a pivot bar, locking paw and release lever of a lifting resistance device.

FIG. 13C is a top plan view of the embodiment of the pivot bar, locking paw and release lever of FIG. 13B.

Figure 1:
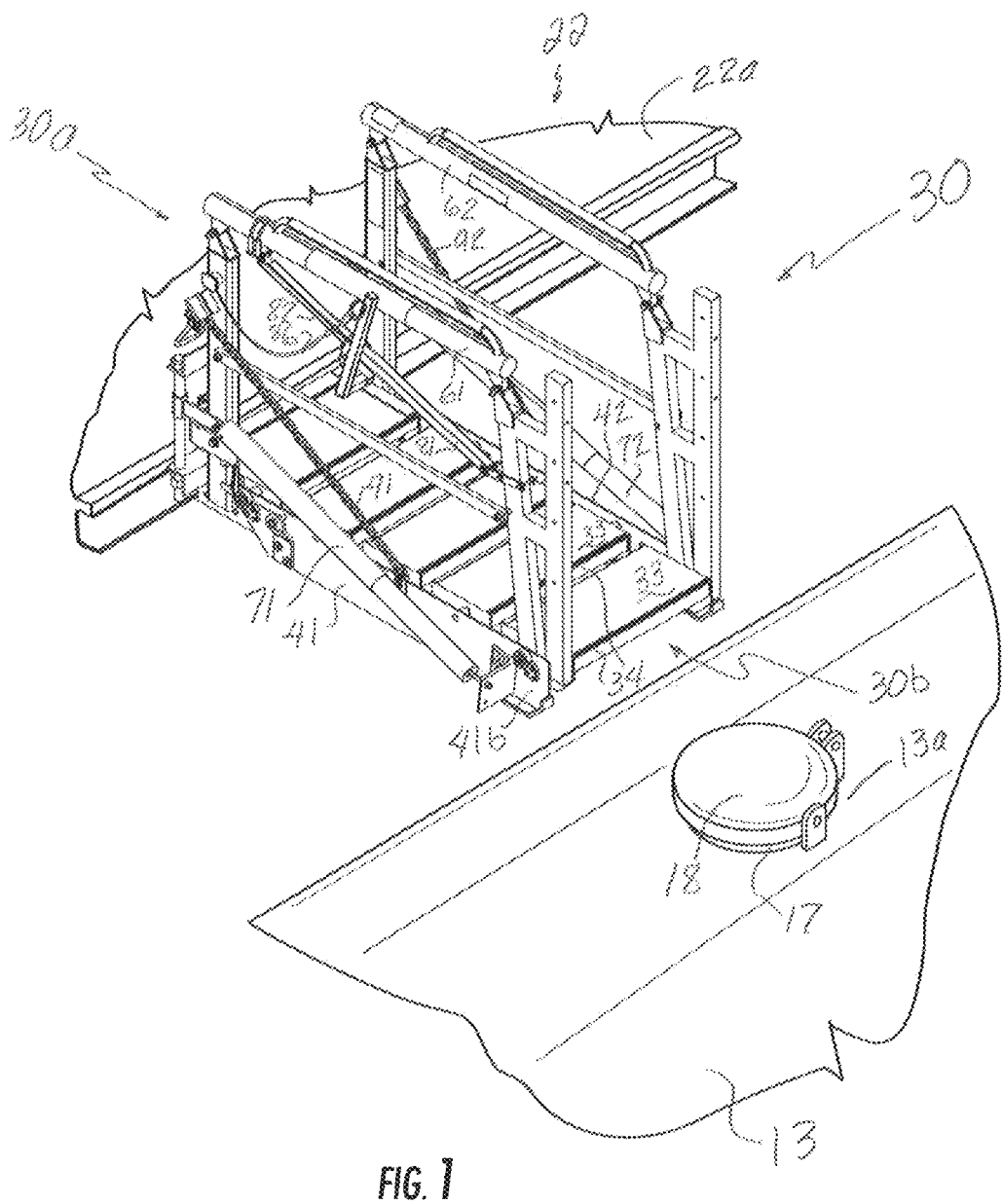
FIG. 1 is an elevated perspective view from the distal end of an embodiment of the gangway of the present invention disposed in an orientation that is being lowered toward the top of a tank shown in partial outline.

The accompanying drawings, which are incorporated in and constitute a part of this specification, illustrate at least one presently preferred embodiment of the invention as well as some alternative embodiments. These drawings, together with the written description, serve to explain the principles of the invention but by no means are intended to be exhaustive of all of the possible manifestations of the invention.

DETAILED DESCRIPTION OF EXEMPLARY EMBODIMENTS OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of embodiments of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all sub-ranges located within the prescribed limits, inclusive of the limits themselves unless otherwise stated. For instance, a range from 50 to 200 also includes all possible sub-ranges, examples of which are from 100 to 150, 170 to 190, 153 to 162, 145.3 to 149.6, and 187 to 200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

Figure 2:
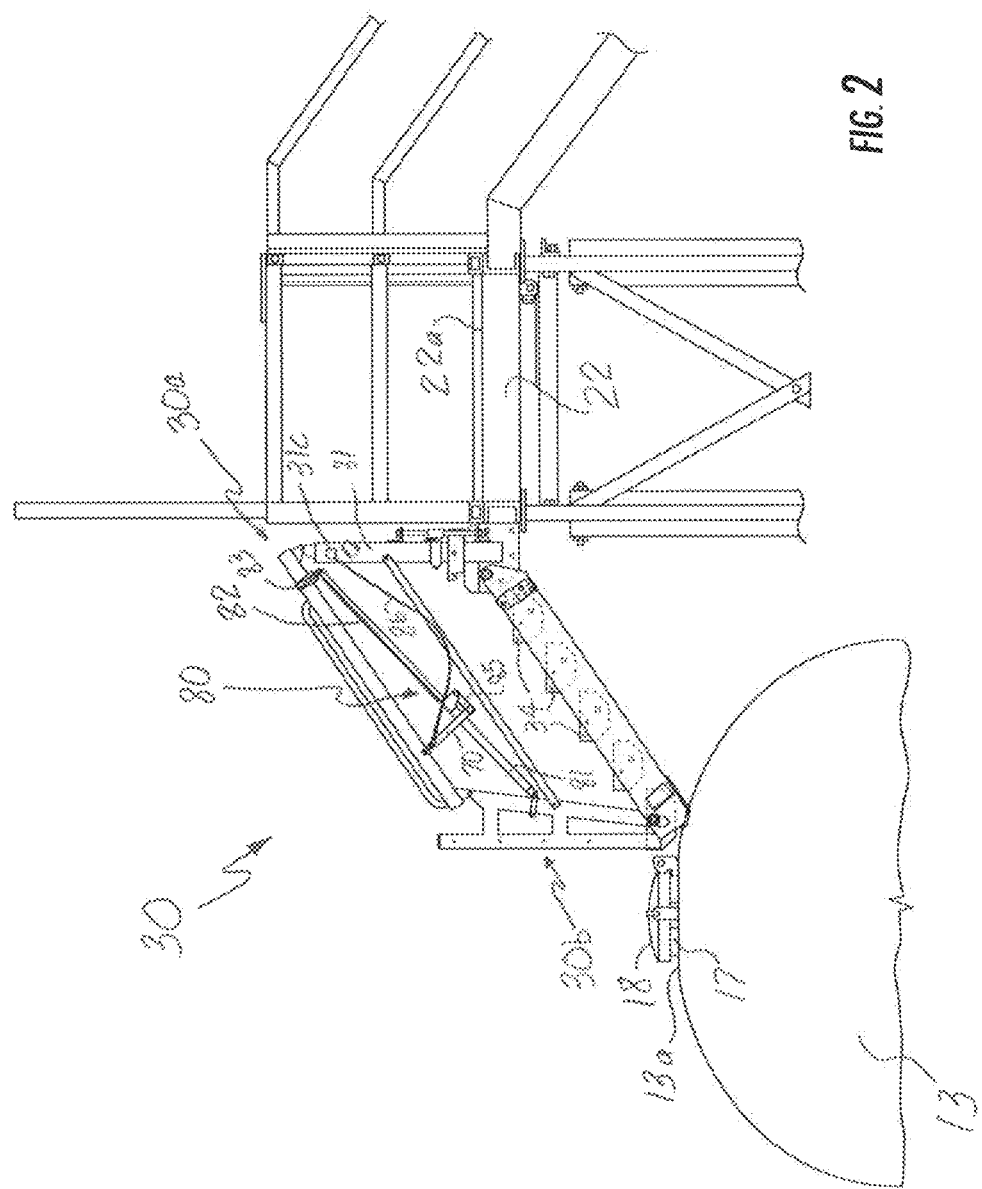
FIG. 2 is a side plan view of the embodiment shown in FIG. 1 taken from the exterior of the gangway but disposed in the working orientation above a railroad tank car that is partially shown.

Referring to FIGS. 1 and 2 for example, because of the curved shape of the top 13a of the main body of a tank 13 and/or the likelihood of encountering slippery surfaces thereon, provision must be made for protection of workers who might slip and fall from the top 13a of the tank 13. Thus, often the top 13a of the storage container 13 carried on railcars or trucks is outfitted with a railing system that provides a fence around the top 13a of the tank 13. Sometimes a railing system is deployed from the loading platform 22 and lowered around the hatch 17 that surrounds an opening that leads into the tank 13, which opening normally is sealed by closure of a hatch cover 18 that is pivotally attached to the exterior of the hatch 17. However, to avoid unduly complicating the drawings of the present application, any such railing system has not been illustrated.

FIGS. 1-7 and 11 depict an embodiment of an apparatus that provides selectively deployable worker access to at least a portion of the top 13a of a container 13 disposed above the ground and generally indicates same by the reference numeral 30. Moreover, the apparatus 30 is commonly referred to as a gangway and will be so referenced throughout this application. As shown in FIGS. 1 and 2 for example, the gangway 30 desirably is configured for being pivotally connected to a platform 22 that selectively provides worker access to at least a portion of the top 13a of a container 13 disposed above the ground. As respectively shown in FIGS. 2 and 6 and 11, the gangway 30 is configured so that it selectively can be deployed in a fully extensible orientation (FIGS. 2 and 6) and a fully retractable orientation (FIG. 11) as well as any orientation in between these two extreme orientations. See FIGS. 1, 3-5 and 7. Arbitrarily using the platform 22 as a point of reference, as used herein, the term inboard or proximal means closer to or in a direction toward the platform 22 and away from the hatch 17 of the tank 13, while the respective opposite term outboard or distal means farther from or in a direction away from the platform 22.

The details of the platform 22 are varied and conventional and can be learned from one or more of U.S. Pat. Nos. 4,679,657; 5,042,612; 5,392,878; 7,140,467, 7,216,741 and 8,015,647; the disclosure of each of the foregoing patents being hereby incorporated herein in its entirety for all purposes by this reference. As schematically shown in FIGS. 1 and 2, the elevated platform typically has a walking deck 22a suspended above the ground that underlies the platform 22. The embodiments of the gangway 30 of the present invention typically are retrofitted to platforms 22 that already exist.

Figure 3:
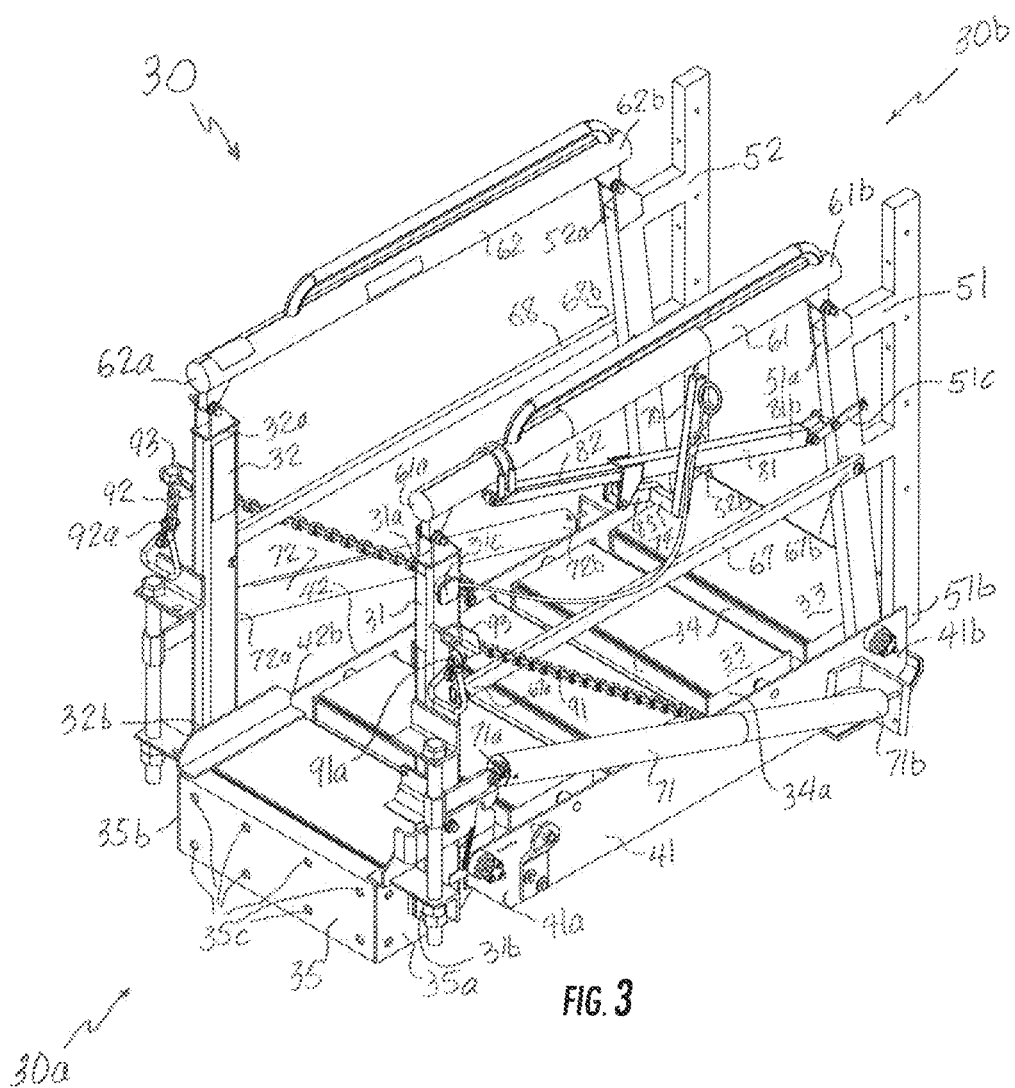
FIG. 3 is an elevated perspective view from the proximal end of an embodiment of the gangway of the present invention disposed in a horizontal orientation before being lowered toward the top of a tank (not shown).
Figure 5:
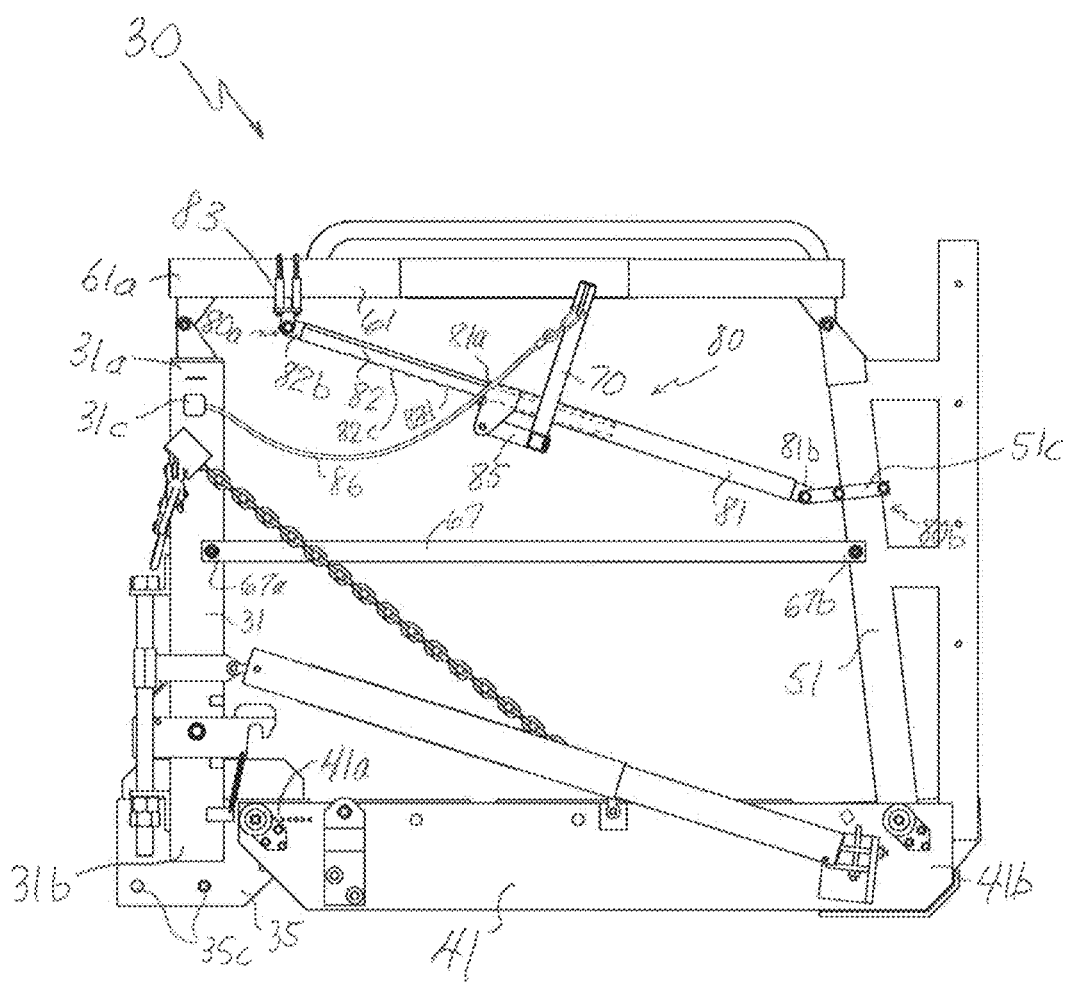
FIG. 5 is a side plan view taken from the outside of the embodiment shown in FIG. 2 but disposed in a horizontal orientation before being lowered toward the top of a tank (not shown).

As embodied herein and indicated generally by the numeral 30 in FIGS. 1 and 2 for example, the gangway 30 elongates in an outboard direction and has a proximal end 30a and a distal end 30b extending opposite the proximal end 30a. As schematically shown in FIG. 3 for example, the proximal end 30a of the gangway 30 desirably includes a first proximal upright 31 and a second proximal upright 32, which is spaced laterally apart from the first proximal upright 31. Each of these proximal uprights 31, 32 has an upper end 31a, 32a and a lower end 31b, 32b that is disposed spaced apart vertically from the respective upper end 31a, 32a of each respective proximal upright 31, 32. The lower end 31b, 32b of each of the proximal uprights 31, 32 desirably is configured for being connected to the platform 22. As shown in FIGS. 3 and 5 for example, the respective lower ends 31b, 32b desirably are attached to a connection box 35 that can be mechanically connected to the platform 22, as for example via threaded bolts (not shown) extending through an array of openings 35c defined by the connection box 35 and secured by washers and threaded nuts (not shown). Indeed, one step in retrofitting a platform 22 with a gangway 30 in accordance with the present invention, involves attaching, as by metal fasteners such as threaded bolts and threaded nuts for example, the connection box 35 to the deck 22a of the platform 22. Desirably, each opposite end of the connection box 35 in turn is connected rigidly to the respective lower end 31b, 32b of each of the respective proximal uprights 31, 32, in a manner so that each of the proximal uprights 31, 32 is disposed to extend vertically with respect to the deck 22a of the platform 22 and extend vertically with respect to the connection box 35 when the connection box 35 is attached to the platform 22. Once each of the proximal uprights 31, 32 is thus in effect anchored to the deck 22a of the platform 22 in a vertical disposition, a firm anchor is provided that will enable the gangway 30 to be pivoted selectively between the extreme extensible orientation (FIG. 6) and the extreme retractable orientation (FIG. 11), as well as any of the intermediate orientations between the two extreme orientations. Desirably, the connection box 35 can be formed of one or more different metals, depending upon the application's requirements of strength, weight and durability and can include mill steel, primed steel, galvanized steel and aluminum.

Figure 4:
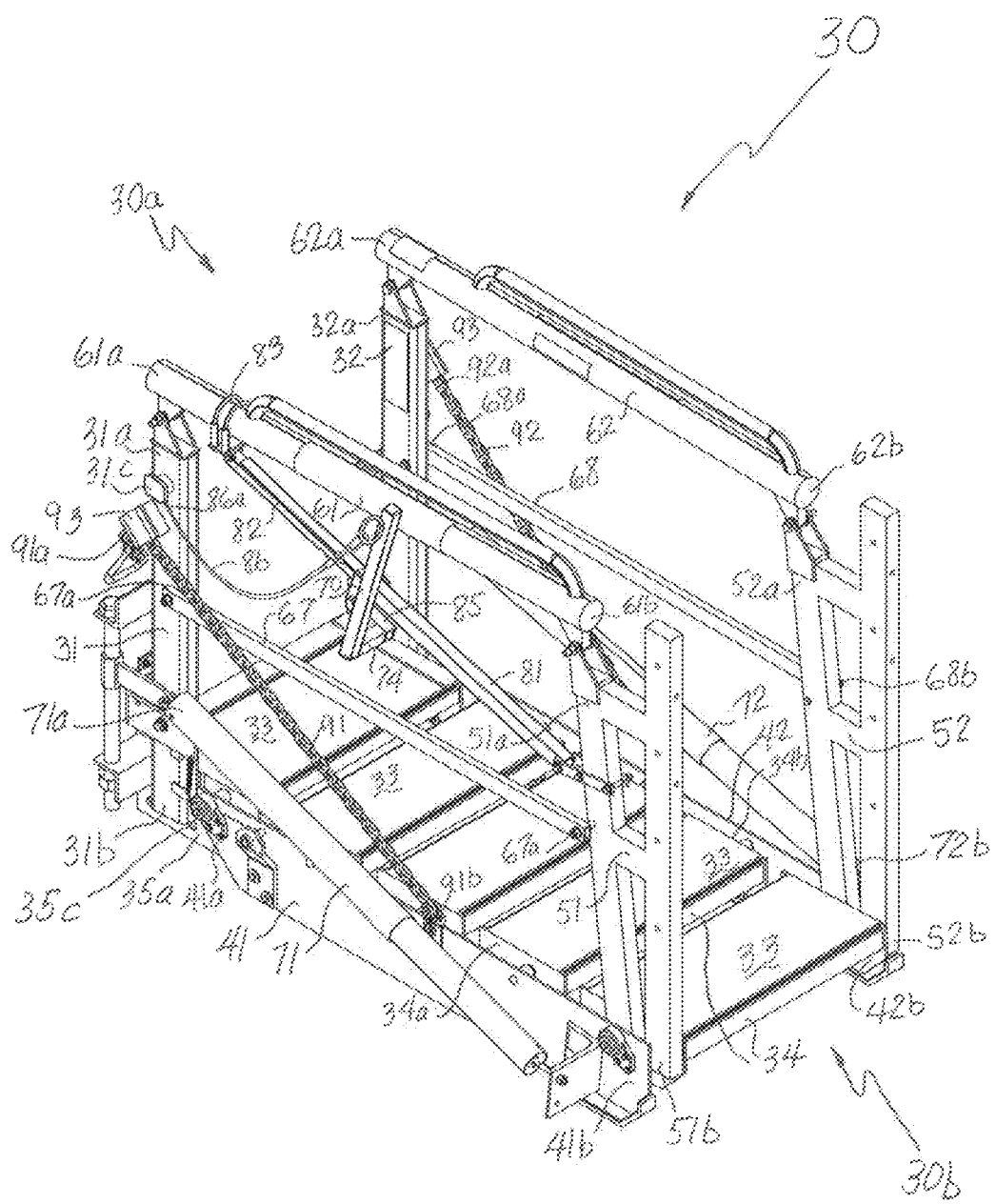
FIG. 4 is an elevated perspective view from the distal end of an embodiment of the gangway of the present invention disposed in a horizontal orientation before being lowered toward the top of a tank (not shown).
Figure 7:
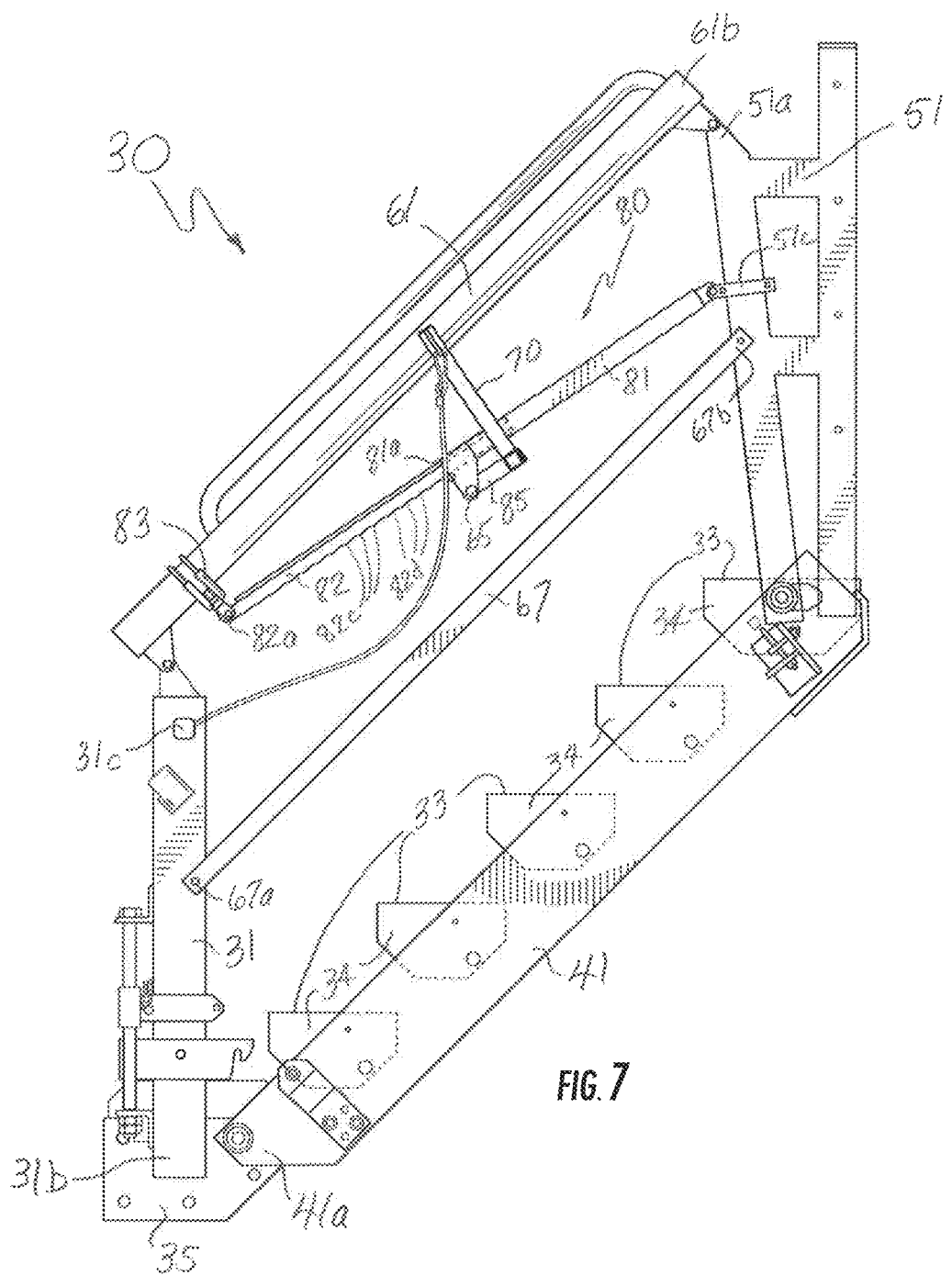
FIG. 7 is a side plan view taken from the outside of the embodiment shown in FIG. 6 disposed in the partially retracted orientation with the distal end of the gangway raised above the platform's walking surface (not shown).

As schematically shown in FIGS. 3 and 4, the gangway 30 desirably includes a first stringer 41 and a second stringer 42. As schematically shown in FIGS. 3 and 4, the first stringer 41 is spaced laterally apart from the second stringer 42. As schematically shown in FIGS. 3 and 4, each respective stringer 41, 42 extends longitudinally between a respective proximal end 41a, 42a and a respective distal end 41b, 42b. As schematically shown in FIGS. 3 and 7, the proximal end 41a of the first stringer 41 desirably is pivotally connected to the lower end 31b of the first proximal upright 31 via the first end 35a of the connection box 35. Though not visible in the view shown in FIG. 3 for example, the proximal end 42a of the second stringer 42 desirably is similarly pivotally connected to the lower end 32b of the second proximal upright 32 via the second end 35b of the connection box 35.

Figure 6:
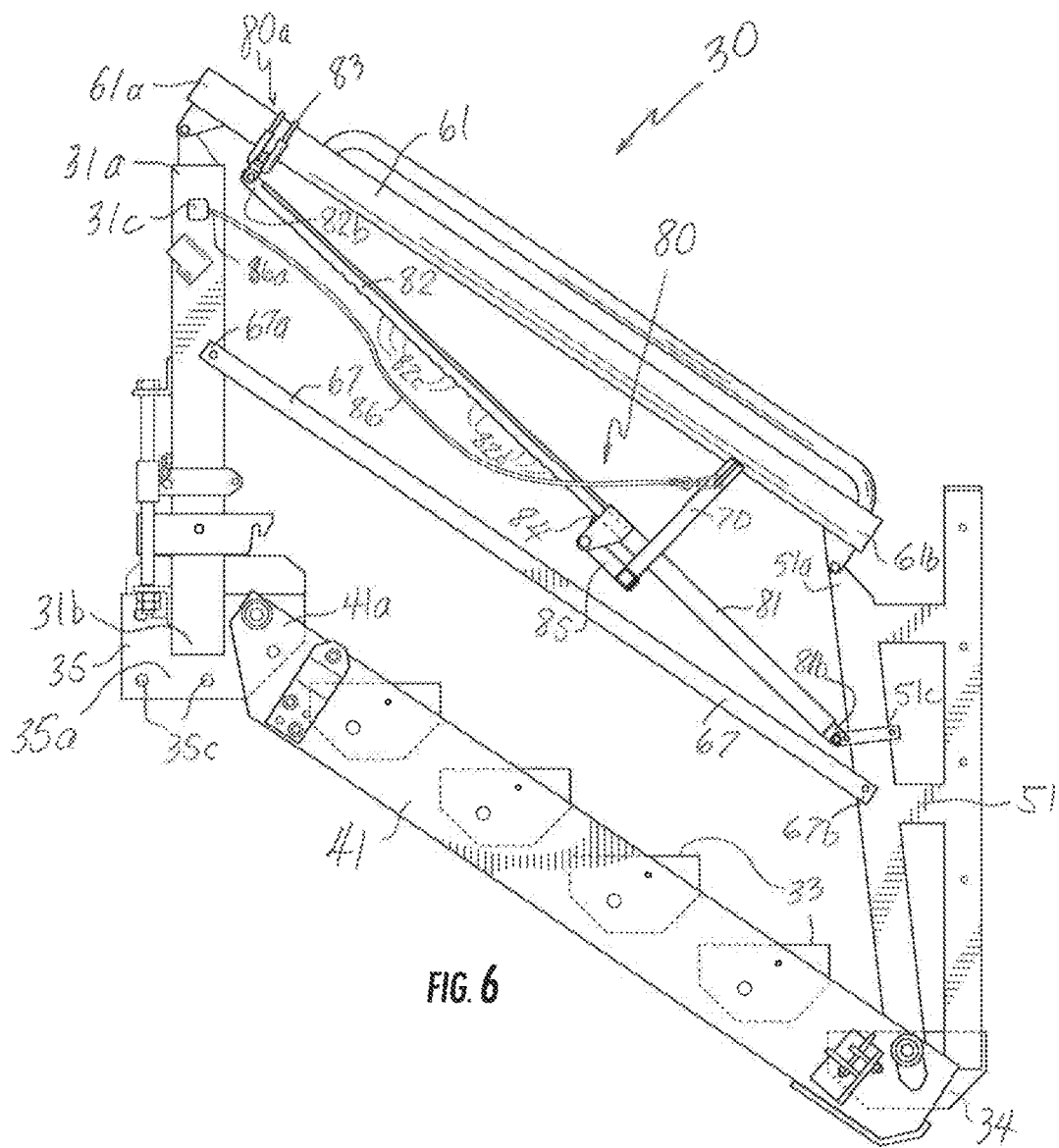
FIG. 6 is a side plan view taken from the outside of the embodiment shown in FIG. 5 disposed in the working orientation with the distal end of the gangway lowered toward the top of a tank (not shown).

As schematically shown in FIGS. 4, 6 and 7, the gangway 30 desirably includes a plurality of steps 34, and each step 34 desirably is disposed spaced apart longitudinally from each other step 34. Gangways 30 come in different sizes that are determined primarily by the number of steps 34 contained in the particular gangway 30. Gangways typically have anywhere between three steps 34 and five steps 34, but different numbers of steps 34 can be accommodated by either lengthening or shortening the longitudinal dimension of the fully deployed gangway 30, and accordingly lengthening the stringers 41 that pivotally carry the steps 34.

As schematically shown in FIGS. 5, 6 and 7, the relationships between the pair of stringers 41, 42 and the individual steps 34 are configured in a conventional manner so that the steps 34 are self-leveling in the sense that when the gangway 30 assumes an orientation that is parallel relative to the horizontal plane (FIG. 5) or any orientation disposed at an angle that descends beneath the horizontal plane (FIG. 6) or elevates above the horizontal plane (FIG. 7), each of the steps 34 always has its flat upper walking surface 33 (aka tread 33) disposed parallel to the horizontal plane, and thus is disposed perpendicular to the direction in which the force of gravity is directed. As schematically shown in FIGS. 3 and 4, each step 34 has a first end 34a pivotally mounted to the first stringer 41 and a second end 34b spaced laterally apart from the first end 34a of the step 34 and pivotally mounted to the second stringer 42.

As shown in FIGS. 3 and 4 for example, the walking surface 33 of the gangway 30 typically is bounded on each respective opposite side by either the first stringer 41 or the second stringer 42. The width of the gangway 30 that is usable by workers to move from the platform 22 to the top 13a of the tank 13 is defined laterally between the first stringer 41 of the gangway 30 and the second stringer 42 of the gangway 30 that is opposing and aligned parallel to the first stringer 41 of the gangway 30. The width of the tread 33 of each step 34 is also measured in this same lateral direction that extends between the first and second stringers 41, 42 of the gangway 30. The depth of the tread 33 of each step 34 is measured in a direction that is perpendicular to the lateral measurement direction of the tread 33. As shown in FIGS. 3 and 4 for example, the combined areas of the treads 33 of the steps 34 of the gangway 30 provide a walking surface 33 upon which workers can walk from the platform 22 onto the top 13a of the tank 13. In one of its operative orientations shown in FIGS. 2 and 6 for example, the walking surface 33 extends generally at a descending angle from the platform 22 and connection box 35 to the top 13a of the tank 13 that is to be accessed by workers for inspection, loading or unloading. However, as shown in FIGS. 4 and 5 for example, the walking surface 33 also easily can extend horizontally between the platform 22 and connection box 35 and the top of the tank 13 (not shown). In its fully stored and fully retracted orientation shown in FIG. 7 for example, the gangway 30 and its walking surface 33 is pivoted above the platform (not shown) and connection box 35 and the stringers 41, 42 of the gangway 30 are disposed generally at an angle with respect to the walking deck 22a of the platform.

Figure 14:
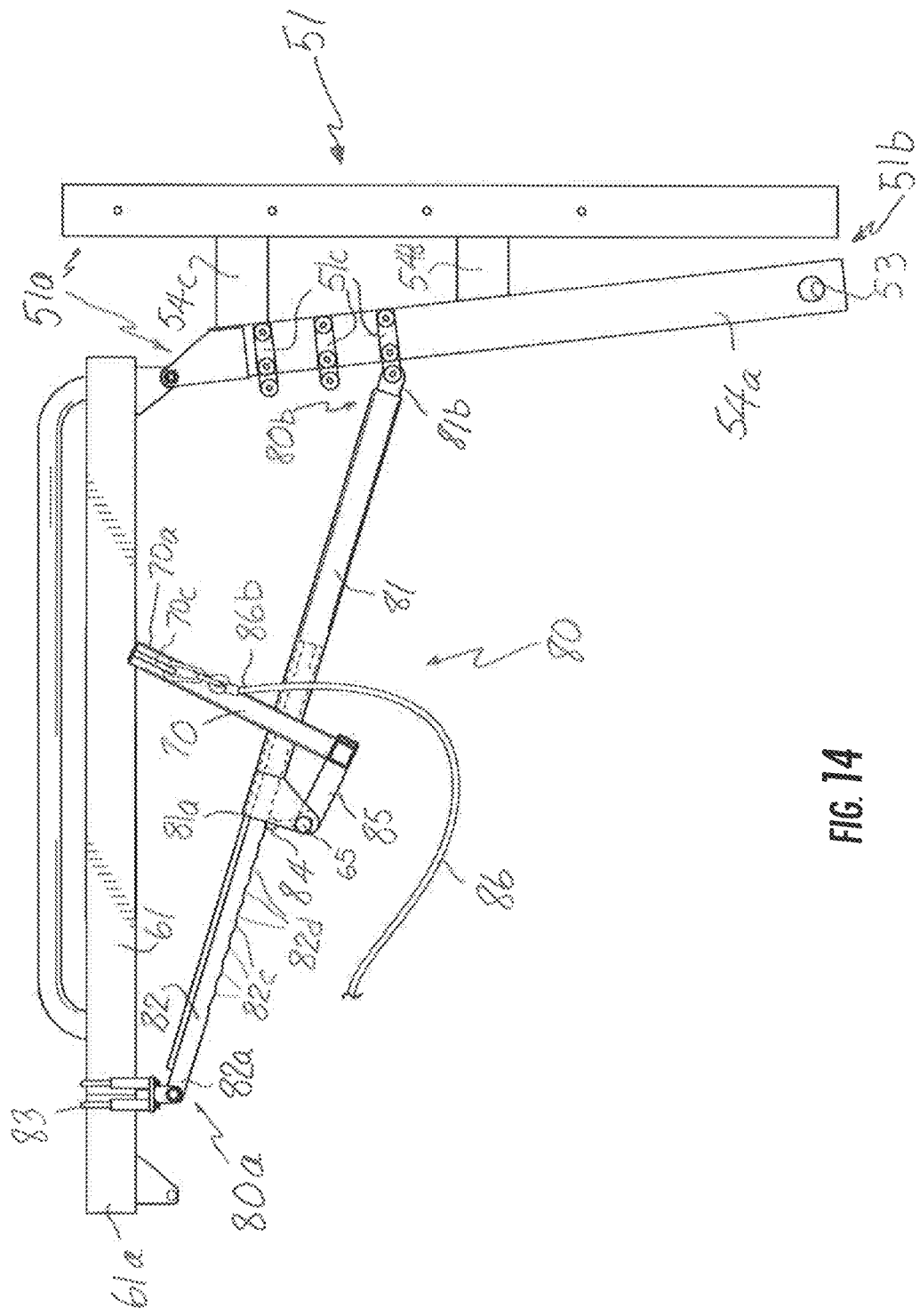
FIG. 14 is a side plan view of a presently preferred embodiment of a lifting resistance device installed on the first top rail and first distal upright of an embodiment of a gangway taken from the outside of the gangway.

As embodied herein and shown in FIGS. 1-8 for example, and as schematically shown in FIGS. 3 and 4 for example, the distal end 30b of the gangway 30 can include a first distal upright 51 and a second distal upright 52 spaced laterally apart from the first distal upright. As shown in FIGS. 3, 4 and 14 for example, each respective distal upright 51, 52 has a respective upper end 51a, 52a and a respective lower end 51b, 52b spaced vertically apart from the respective upper end 51a, 52a. The lower end 51b of the first distal upright 51 desirably is pivotally connected to the distal end 41b of the first stringer 41. As is conventional and shown in FIG. 14 for example, this pivotal connection desirably is facilitated by a circular opening 53 defined through the lower end 51b that carries and receives therein a trunnion (not shown) extending therethrough and about which the distal upright 51 is rotatable. The lower end 52b of the second distal upright 52 desirably is similarly connected pivotally to the distal end 42b of the second stringer 42. As shown in FIG. 14 for example, the first distal upright 51 desirably includes two elongated posts 54a, 54b that are attached to one another via an upper cross-brace 54c and a middle cross-brace 54d, a forward one of the posts 54b being longer than a rearward one of the posts 54a, which elongate in directions that diverge from one another by an acute angle that desirably is less than 15°. The second distal upright 52 is configured in the same way as the first distal upright 51.

In the exemplary embodiment shown in FIGS. 1-8 for example, and as schematically shown in FIGS. 3 and 4 for example, the gangway 30 can include a first top rail 61 extending longitudinally between a proximal end 61a and a distal end 61b. The proximal end 61a of the first top rail 61 desirably is pivotally connected to the upper end 31a of the first proximal upright 31. The distal end 61b of the first top rail 61 desirably is pivotally connected to the upper end 51*a* of the first distal upright 51. Similarly, the gangway 30 can include a second top rail 62 extending longitudinally between a proximal end 62*a* and a distal end 62*b*. The proximal end 62*a* of the second top rail 62 desirably is pivotally connected to the upper end 32*a* of the second proximal upright 32. The distal end 62*b* of the second top rail 62 desirably is pivotally connected to the upper end 52*a* of the second distal upright 52. Each respective top rail 61, 62 desirably carries an elongated handrail above the upper surface of the respective top rail 61, 62, and each respective handrail provides a convenient place for the user to grab onto when walking on the treads 33 of the gangway 30.

In the exemplary embodiment shown in FIGS. 1-8 for example, and as schematically shown in FIGS. 3 and 4 for example, the gangway 30 desirably can include a first midrail 67 and a second midrail 68. Each of the respective midrails 67, 68 desirably can be respectively disposed at a vertical distance that is between where the respective top rail 61, 62 and the walking surface 33 of the gangway 30 are disposed. Thus, each respective top rail 61, 62 will be disposed farther from the walking surface 33 of the gangway 30 than each of the respective midrails 67, 68. However, while desirable, there can be embodiments of the gangway 30 that can dispense with midrails 67, 68. Moreover, the midrails 67, 68 need not be disposed vertically halfway between the respective top rails 61, 62 and the upper edges of the respective stringers 41, 42, though that relative disposition is considered desirable.

In those embodiments including first and second midrails 67, 68, each respective midrail 67, 68 extends longitudinally between a respective proximal end 67*a*, 68*a* and a respective distal end 67*b*, 68*b*. As shown in FIGS. 3 and 4 for example, the proximal end 67*a* of the first midrail 67 desirably is pivotally connected to the first proximal upright 31 between the upper end 31*a* and the lower end 31*b* of the first proximal upright 31. The distal end 67*b* of the first midrail 67 desirably is pivotally connected to the first distal upright 51 between the upper end 51*a* and the lower end 51*b* of the first distal upright 51. Similarly, the proximal end 68*a* of the second midrail 68 desirably is pivotally connected to the second proximal upright 32 between the upper end 32*a* and the lower end 32*b* of the second proximal upright 32. Likewise, the distal end 68*b* of the second midrail 68 desirably is pivotally connected to the second distal upright 52 between the upper end 52*a* and the lower end 52*b* of the second distal upright 52.

As is conventional with any sprung gangway, and as shown in FIGS. 3 and 4 for example, the gangway 30 desirably can include a first spring tube 71 extending longitudinally between a proximal end 71*a* and a distal end 71*b*. A second spring tube 72 similarly extends longitudinally between a proximal end 72*a* and a distal end 72*b*. Each spring tube 71, 72 is the mechanism that acts as a counterbalance to the weight of the gangway 30 so that it can be moved between the fully stored orientation and the operative orientation by a typical individual user applying a reasonable amount of force that is well within the capability of a typical user of these gangways 30. An exemplary embodiment of a spring tube 71, 72 is schematically shown in FIGS. 3 and 4 for example and is provided by a cylindrical coil spring (desirably made of steel) that is disposed within a pair of metal cylindrical tubes (desirably made of aluminum to minimize weight) consisting of a larger diameter outer tube and a smaller diameter inner tube that telescopes within the outer tube. The opposite free ends of the spring are accessible through the respective exposed open end of the respective tube. As the coil spring stretches, the inner tube extends away from the outer tube so that regardless of how the coil spring is extending or retracting, the spaces between the coils when the spring is extended will not be exposed to catch anything between the coils when the spring is undergoing retraction. Each of the free ends of the coil spring is provided with an attachment mechanism (such as a hooked end) by which one opposite end of the spring can be pivotally connected to the distal end 41*b*, 42*b* of the respective stringer 41, 42 of the gangway 30 and the other opposite end of the spring can be pivotally connected to the proximal end 30*a* of the gangway 30.

As shown in FIGS. 3 and 4 for example, the proximal end 71*a* of the first spring tube 71 desirably is pivotally connected to the first proximal upright 31 between the lower end 31*b* of the first proximal upright 31 and where the proximal end 67*b* of the first midrail 67 is pivotally connected to the first proximal upright 31. However, in embodiments lacking the guidance provided by the location of the first midrail 67, the pivotal attachment of the proximal end 71*a* of the first spring tube 71 desirably occurs about one fifth to about one third of the vertical length of the first proximal upright 31 above the walking surface 33 of the step 34 of the gangway 30 nearest the proximal end 30*a* of the gangway 30. The distal end 71*b* of the first spring tube 71 desirably is pivotally connected to the distal end 41*b* of the first stringer 41.

As shown in FIGS. 3 and 4 for example, the proximal end 72*a* of the second spring tube 72 desirably is pivotally connected to the second proximal upright 32 between the lower end 32*b* of the second proximal upright 32 and where the proximal end 68*a* of the second midrail 68 is pivotally connected to the second proximal upright 32. However, in embodiments lacking the guidance provided by the location of the second midrail 68, the pivotal attachment of the proximal end 72*a* of the second spring tube 72 desirably occurs about one fifth to about one third of the vertical length of the second proximal upright 32 above the walking surface 33 of the step 34 of the gangway 30 nearest the proximal end 30*a* of the gangway 30. The distal end 72*b* of the second spring tube 72 desirably is pivotally connected to the distal end 42*b* of the second stringer 42.

In accordance with the present invention, each embodiment of the gangway 30 includes a selectively extensible and retractable lifting resistance device. The lifting resistance device must be capable of changing its linear longitudinal dimension so that this dimension can be both increased and decreased, as needed to accommodate the operation of the gangway 30. Nevertheless, the lifting resistance device desirably must be capable of engaging so as to maintain a fixed linear dimension in order to restrain the gangway 30 in place at the desired linear extension of the gangway 30 that reaches the operative orientation by which workers are permitted access to the top 13*a* of the tank 13. A function of this lifting resistance device is to prevent inadvertent lifting of the gangway 30 from the distal end 30*b* of the gangway 30. Another function of this lifting resistance device is to permit workers to lift the gangway from the proximal end 30*a* of the gangway 30 while preventing inadvertent or accidental release of the lifting resistance device by activity occurring at or near the proximal end 30*a* of the gangway 30. Thus, the lifting resistance device is configured to permit at least one user's intentional action at the proximal end 30*a* of the gangway 30 to release the lifting resistance device and permit unrestrained lifting of the distal end 30*b* of the gangway 30 away from the top 13*a* of the tank 13 shown in FIGS. 1 and 2. Desirably, the lifting resistance device can be disengaged from its retention mode by a single user at the distal end 30b of the gangway 30 who exerts a substantial lifting force of a magnitude that would be deemed within the capability of a typical user. Desirably, the lifting resistance device should not impede the user, such as calling for additional force on the part of the user, from deploying the gangway 30 into the operative orientation of the gangway 30 for walking traffic of the users. Desirably, the lifting resistance device lends itself to installation as both original equipment and retrofit equipment and can be purchased and installed at reasonable cost and without undue complexity.

As shown in FIGS. 5-7, 12 and 14 for example, embodiments of the selectively extensible and retractable lifting resistance device are indicated generally by the numeral 80. As shown in FIG. 12 for example, the lifting resistance device 80 desirably has a proximal end 80a and a distal end 80b longitudinally spaced apart from the proximal end 80a. Moreover, the distance between the proximal end 80a and the distal end 80b is selectively variable and selectively adjustable by the user. As shown in FIGS. 5-7 for example, the proximal end 80a of the lifting resistance device 80 desirably is pivotally connected to the first top rail 61 at a location that is nearer to the proximal end 61a of the first top rail 61 than to the midpoint of the first top rail 61. The distal end 80b desirably is pivotally connected to the first distal upright 51 between the upper end 51a of the first distal upright 51 and where the distal end 67b of the first midrail 67 is pivotally connected to the first distal upright 51. However, for gangway embodiments lacking the guidance provided by the location of the first midrail 67, the pivotal attachment of the distal end 80b of the lifting resistance device 80 desirably occurs closer to the upper end of the first distal upright 51 than to the lower end of the first distal upright 51 and desirably occurs about one fifth to about one third of the vertical length of the first distal upright 51 beneath the first top rail 61 of the gangway 30. Moreover, the precise location of the pivotal attachment of the distal end 80b of the lifting resistance device 82 to the first distal upright 51 becomes a function of the length of the gangway 30 and accordingly depends on the dimensions of the steps 34 and the depths of their treads 33. Additionally though the lifting resistance device 80 has been shown connected to the first top rail 61 and the first distal upright 51, the lifting resistance device 80 just as easily could be connected to the second top rail 62 and the second distal upright 52.

Figure 8:
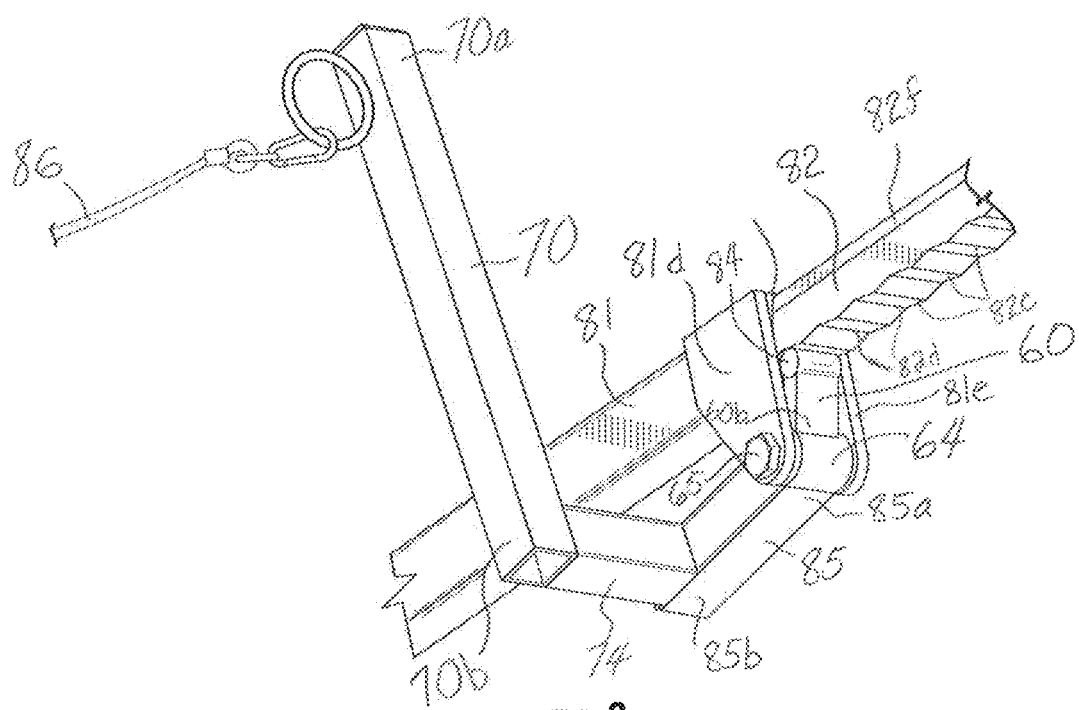
FIG. 8 is an elevated perspective view from beneath embodiments of components of a device for resisting lifting of a gangway.
Figure 15:
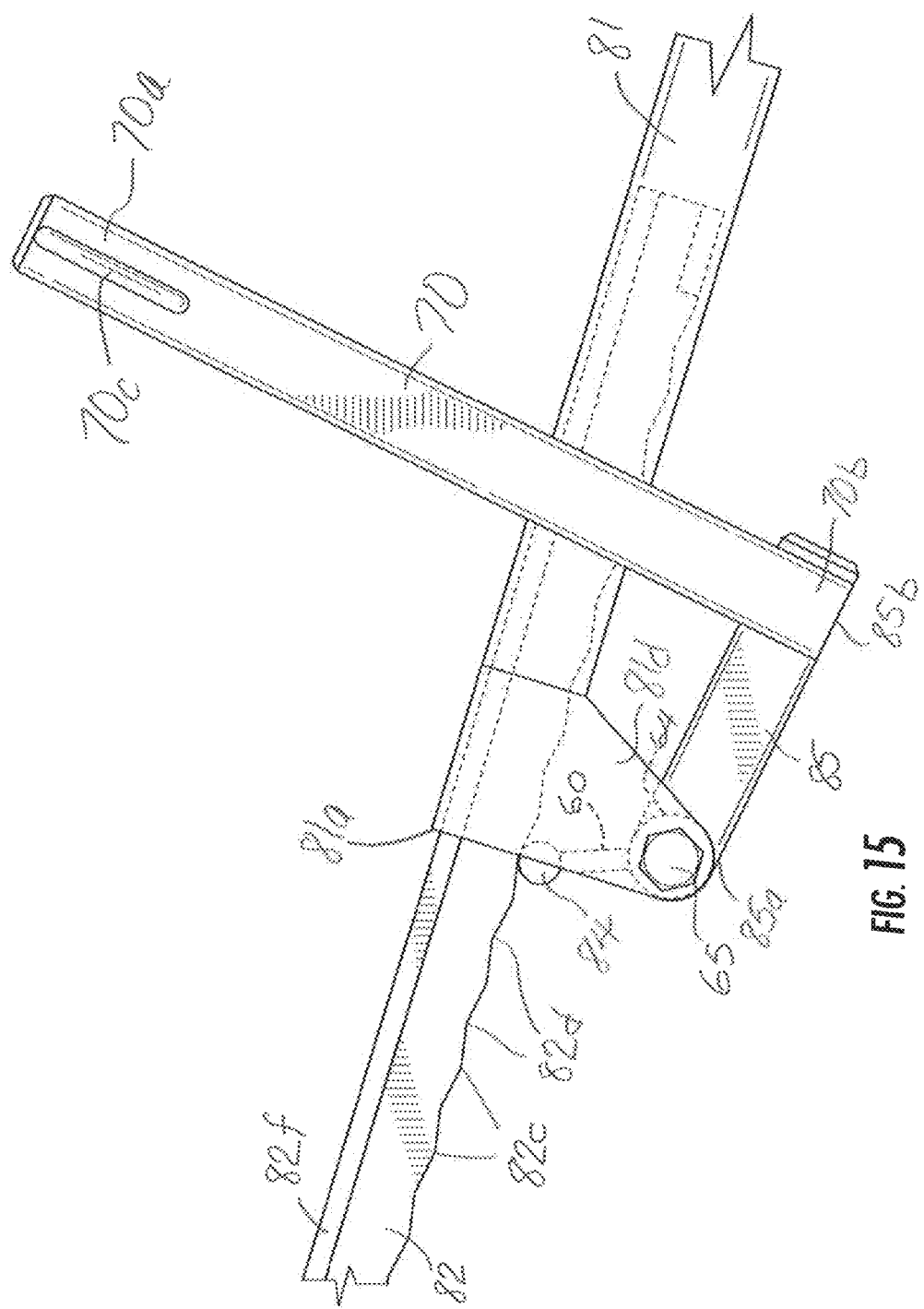
FIG. 15 is a side plan view of parts of some of the components of a presently preferred embodiment of a lifting resistance device similar to the view of FIG. 9.

As shown in FIGS. 4, 7, 8 and 12 for example, each embodiment of the lifting resistance device 80 desirably includes a longitudinally elongated sheath 81. As shown in FIGS. 8, 12 and 15 for example, the elongated sheath 81 has a hollow interior that in one embodiment can measure about one and one quarter inches on each side. The elongated sheath 81 desirably has at one end thereof an open end 81a defining an opening and leading into the hollow interior of the sheath 81. At the opposite end of the sheath 81, there is a closed end 81b of the sheath 81.

As shown in FIG. 12 for example, the open end 81a of the sheath 81 is the end of the sheath 81 that is disposed toward the proximal end 80a of the lifting resistance device 80. The closed end 81b of the sheath 81 desirably is pivotally connected to a distal pivotal attachment bracket 51c. As shown in FIG. 3 for example, the distal pivotal attachment bracket 51c in turn is attached to the first distal upright 51 at a distance about one third of the height of the distal upright 51 from the upper end 51a of the distal upright 51, and this placement typically would coincide with the gangway 30 having five steps 34 with treads 33 of standard depth.

As schematically shown in FIG. 14 for example, the placement of the distal pivotal attachment bracket 51c can be made closer to the upper end 51a of the first distal upright 51 to accommodate gangways with four steps 34 or just three steps 34, the latter three step 34 gangway 30 calling for the positioning of the distal pivotal attachment bracket 51c the closest to the upper end 51a of the first distal upright 51.

As shown in FIGS. 5-7, 8, 12, 14 and 15 for example, the hollow interior of the sheath 81 is configured for slidably receiving therein an elongated linear index rail 82 that desirably forms a linearly movable component of a desirable embodiment of the lifting resistance device 80. As shown in FIG. 13A for example, the linear index rail 82 is an elongated steel rod of square transverse cross-sectional dimensions that in one embodiment is about 28 and one sixteenth inches in length and has a blind end 82a opposite a projecting end 82b. The linear index rail 82 desirably is about one inch wide. As shown in FIG. 13A for example, one elongated edge of this embodiment is a working edge in which is formed a repeating pattern of alternating vertices 82c and nadirs 82d evenly spaced along most of the length of this working edge of the linear index rail 82 beginning at the blind end 82a and extending toward the projecting end 82b for about 23 inches. Each of the vertices 82c and nadirs 82d of this working edge of the linear index rail 82 is defined by an obtuse angle. The angle defining each vertex 82c desirably is about 140 degrees, and the angle defining each nadir 82d desirably is about 160 degrees. Thus, the slopes of the sides of the vertices 82c are steeper than the slopes of the sides that define each of the nadirs 82d. The linear distance between adjacent vertices 82c and between adjacent nadirs 82d desirably is about one inch and desirably is uniform for the vertices 82c and the nadirs 82d. The thickness of the linear index rail 82 measured from a vertex 82c to the flat back edge desirably is about three-quarters of an inch deep.

However, as shown in FIGS. 13A and 15 for example, an insert 82e of ultra high molecular weight (UHMW) polyethylene plastic material having a countersunk opening therethrough desirably is attached to the working edge at the blind end 82a of the linear index rail 82 by a countersunk flathead screw so as to cover a portion of adjacent vertices 82c and nadirs 82d at the blind end 82a of the linear index rail 82. The length of this insert 82e desirably measures about seven-eighths of an inch. Moreover, as shown in FIGS. 13A and 15, the elongated flat back edge that is opposite the working edge of the linear index rail 82 has a flat smooth even surface that desirably is covered by an elongated strip 82f of the UHMW material that is attached thereto desirably by three flathead screws that pass through countersunk openings in the strip 82f of UHMW material. The thickness of this strip 82f is about one quarter of an inch, and thus when this strip 82f is attached to the linear index rail 82, the combined thickness is about one inch. As shown in FIG. 15 for example, the blind end 82a of the linear index rail 82 leads into the interior of the sheath 81 and thus is not visible in any of the other views shown in the figures except FIG. 13A. The linear index rail 82 is configured so that it selectively slides into and out of the hollow interior of the sheath 81 in a fashion similar to the smaller diameter tube of a telescope, and the strip 82f and insert 82e of UHMW material reduce friction between the linear index rail 82 and the interior of the sheath 81 and thus aid in facilitating the sliding movements of the linear index rail 82.

As shown in FIG. 12 for example, the proximal end 80a of the lifting resistance device 80 includes an adjustable clamp 83. As shown in FIG. 13A for example, the projecting end 82b of the linear index rail 82 desirably is provided with a circular opening 82*g* by which to become pivotally connected to the gangway 30. As shown in FIGS. 12 and 14 for example, the projecting end 82*b* of the linear index rail 82 desirably is pivotally connected to the adjustable clamp 83 that in turn is connected to the proximal end 61*a* of the first top rail 61.

In an alternative embodiment, the adjustable clamp 83 is pivotally attached to the closed end 81*b* of the sheath 81 and selectively adjustably attached at a desired location along the first top rail 61 as discussed above for example. In both embodiments, the position of the clamp 83 relative to the first top rail 61 is adjustable along the length of the first top rail 61 depending on the dimensions of the gangway 30, and in particular the number of steps 34 that are included in the gangway 30 and the depths of their treads 33. In the alternative configuration, the projecting end 82*b* of the linear index rail 82 desirably is pivotally connected to the first distal upright 51 between the upper end 51*a* of the first distal upright 51 and where the distal end 67*b* of the first midrail 67 is pivotally connected to the first distal upright 51. In the alternative configuration, the projecting end 82*b* of the linear index rail 82 desirably is pivotally connected to a distal pivotal attachment bracket 51*c* that in turn is attached to the first distal upright 51 at a distance about one third of the height of the distal upright 51 from the upper end 51*a* of the distal upright 51 for a five step 34 gangway 30 embodiment.

As shown in FIGS. 5-7 for example, the elongated sheath 81 and elongated linear index rail 82 desirably are connected to the gangway 30 in an orientation so that the vertices 82*c* and nadirs 82*d* of the linear index rail 82 are disposed facing away from the first top rail 61 and facing toward the steps 34 so that they are facing toward the direction from which the pull of gravity would be felt by the vertices 82*c* and nadirs 82*d* for example.

As schematically shown in FIGS. 8, 13B and 15 for example, the lifting resistance device 80 desirably includes a locking paw 84 that is pivotally mounted to the sheath 81 near the entrance opening at the open end 81*a* of the sheath 81. The pivotable mounting enables the locking paw 84 to be disposed selectively to engage the linear index rail 82 by direct contact with the opposing edge of the linear index rail 82 in which are defined the nadirs 82*d* and vertices 82*c* or to disengage from direct contact with the opposing edge of the linear index rail 82. As schematically shown in FIG. 13B for example, the locking paw 84 desirably is configured and sized with a shape that is complementary to and rests in the nadirs 82*d* between the vertices 82*c* defined in the opposing edge of the linear index rail 82. The locking paw 84 desirably is a solid cylindrical element such as a cylindrical steel rod desirably one inch in length and having a diameter that is one half inch for example.

As schematically shown in FIGS. 8 and 15 for example, the locking paw 84 is non-rotatably mounted (as by welding for example) to an arm 60. As schematically shown in FIG. 8 for example, the locking paw 84 desirably is non-rotatably mounted at a proximal end 60*a* of the arm 60. An exemplary arm 60 can be formed by a steel bar measuring one inch in length, $^{55}\!/_{64}$ of one inch in width and one-quarter inch in thickness. The length dimension of the arm 60 extends radially from the outer cylindrical surface of a hollow cylindrical sleeve 64, and the width dimension of the arm 60 extends axially with respect to the cylindrical outer surface of the hollow cylindrical sleeve 64.

As schematically shown in FIG. 8 for example, opposite to the proximal end 60*a* of the arm 60 is the distal end 60*b* that desirably is attached to the outer cylindrical surface of a hollow cylindrical sleeve 64. An exemplary hollow cylindrical sleeve 64 is formed of steel and measures one and one-eighth inches long with a one inch outside diameter. As shown in FIG. 13B for example, the sleeve 64 defines therethrough a cylindrical central opening 64*a* measuring about $^{25}\!/_{64}$ of an inch in diameter. As schematically shown in FIGS. 8 and 12 for example, the hollow cylindrical sleeve 64 is rotatably mounted about its central cylindrical axis on an axle 65, which desirably can be formed by a steel bolt 65 that extends through the cylindrical opening 64*a* through the hollow cylindrical sleeve 64.

As schematically shown in FIG. 8 for example, near the open end 81*a* of the sheath 81, a first flange 81*d* depends from a first side of the sheath 81 and a second flange 81*e* depends from the opposite side of the sheath 81 and mirrors the first flange 81*d* in both its configuration and disposition. Each of the free end of the first flange 81*d* and the free end of the second flange 81*e* is spaced farther away from the sheath 81. One of the opposite ends of the axle 65 is held (as by a mechanical fastener such as a washer and threaded nut) in a respective one of the free ends of the first flange 81*d* or the second flange 81*e*, and the other one of the opposite ends of the axle 65 is held (as by a mechanical fastener such as a washer and threaded nut) in the other respective one of the free ends of the first flange 81*d* or the second flange 81*e* so that the axle 65 extends between the fork that is formed by the first flange 81*d* and the second flange 81*e*. Desirably, both the first flange 81*d* and the second flange 81*e* are united as part of an integral structure that includes the sheath 81.

Figure 9:
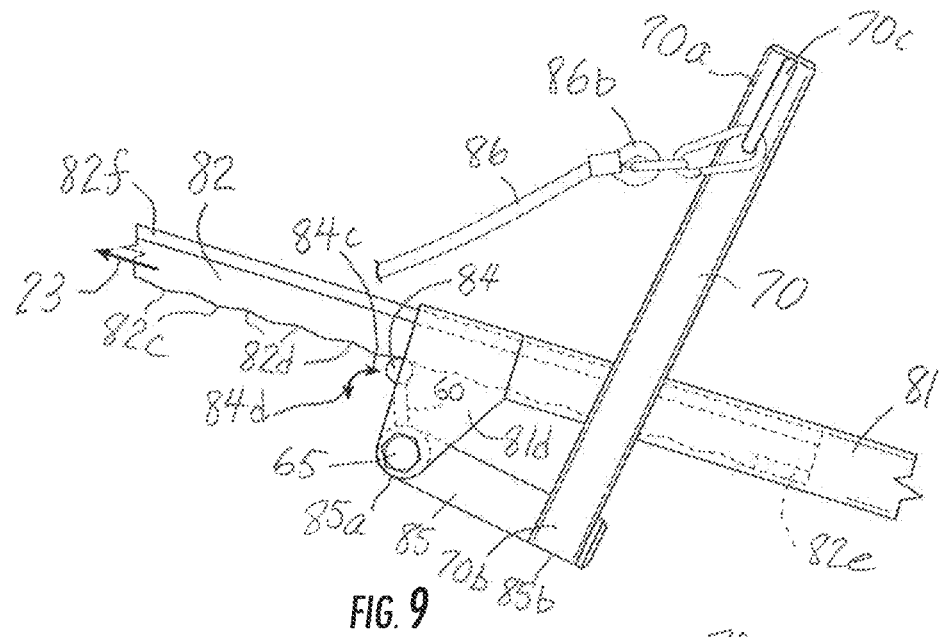
FIG. 9 is a side plan view of the embodiments shown in FIG. 8 with the lifting resistance device engaged to restrain the gangway in the working orientation shown in FIG. 6 for example.

When the locking paw 84 is engaging with one of the nadirs 82*d* between a pair of adjacent vertices 82*c* of the linear index rail 82 as shown in FIGS. 8, 9 and 15 for example, the lifting resistance device 80 is restrained from moving in the direction into the hollow interior of the sheath 81 or out of the hollow interior of the sheath 81. This is because as shown in FIG. 15 for example, the arm 60 has a length such that the distance between the centerline of the axle 60 and the opposing surface of the linear index rail 82 disposes the locking paw 84 against the rising side of the nadir 82*d*. Thus, the arm 60 is pointing the locking paw 84 in a direction opposing movement of the linear index rail 82 toward the locking paw 84. However, the arm 60 is pointing the locking paw 84 along the same direction as the direction of movement of the linear index rail 82 out of the interior of the sheath 81. Accordingly, if enough lifting force (in the range on the order of fifty to one hundred fifty pounds of force) is exerted on the distal end 30*b* of the gangway 30, then it becomes possible for a worker to force the locking paw 84 to act as a cam follower that rides the surface formed by the alternating vertices 82*c* and nadirs 82*d* of the linear index rail 82 and thereby permits the gangway 30 to be raised from the lowered position depicted in FIG. 6 toward the horizontal position depicted in FIG. 5 by moving the linear index rail 82 in the direction in which the straight arrow 23 is pointing in FIG. 9 for example. This is one way that locking paw 84 can be disengaged selectively from the linear index rail 82 under control of the user.

Moreover, the distance between adjacent nadirs 82*d* in effect indexes the different lengths at which the lifting resistance device 80 can be set to restrain movement of the gangway 30.

As schematically shown in FIG. 9 for example, the locking paw 84 and attached arm 60 are pivotable in a single plane as a unit only in the two directions indicated by the curved arrow 84*c* pointing toward the open end 81*a* of the sheath 81 (clockwise in the view shown in FIG. 9 from the viewer's perspective) and the curved arrow 84*d* pointing away from the open end 81*a* of the sheath 81 (counterclockwise in the view shown in FIG. 9 from the viewer's perspective). When the locking paw 84 and attached arm 60 are pivoted in the direction indicated by the curved arrow 84d schematically shown in FIGS. 9 and 10 for example, the locking paw 84 is released from engaging with any of the nadirs 82d and adjacent vertices 82c of the linear index rail 82. The linear index rail 82 is then released to slide freely into the hollow interior of the sheath 81 in the direction in which the straight arrow 25 is pointing in FIG. 10 for example. Similarly, the linear index rail 82 is then also released to slide freely out of the hollow interior of the sheath 81 in the direction in which the straight arrow 23 is pointing in FIG. 9 for example.

The lifting resistance device 80 includes a mechanically operative mechanism by which the restraining engagement can be released under control of the user. Moreover, this release mechanism desirably can be actuated manually by the user from the proximal end 30a of the gangway 30. As schematically shown in FIGS. 8 and 15 for example, the lifting resistance device 80 desirably includes a pivot bar 85 having a proximal end 85a that is non-rotatably attached to the hollow cylindrical sleeve 64, which in turn is attached to the arm 60 that carries the locking paw 84. A distal end 85b of the pivot bar 85 is disposed longitudinally spaced apart from the proximal end 85a. The pivot bar 85 is pivotally connected to the sheath 81 via the hollow cylindrical sleeve 64 that is rotatable about the axle 65, and this pivotal connection desirably is located at the proximal end 85a of the pivot bar 85. An embodiment of the pivot bar 85 desirably can be provided by a hollow steel tube measuring four inches in length and having a square transverse cross section with one inch sides. As schematically shown in FIGS. 8 and 15 for example, the distal end 85b of the pivot bar 85 is positioned farther away from the pivot point about the axle 65 so that the force of gravity acts to further bias the proximal end 85a carrying the locking paw 84 in an orientation that serves to bias the locking paw 84 pressed against and engaging with the edge of the linear index rail 82 that defines the vertices 82c and nadirs 82d with the most stable position of the locking paw 84 resting in one of the nadirs 82d. Moreover, in some embodiments, the pivot bar 85 desirably is more heavily weighted on the distal end 85b relative to the weight of the proximal end 85a.

As embodied herein and shown in FIG. 8 for example, the release mechanism of the lifting resistance device 80 desirably includes a release lever 70 having a proximal end 70a and a distal end 70b, which is non-rotatably and rigidly attached to the distal end 85b of the pivot bar 85. Desirably, as shown in FIG. 8 for example, a bridge 74 connects the lever 70 to the pivot bar 85. The bridge 74 has one end rigidly connected to the distal end 70b of the lever 70 and an opposite end rigidly connected to the distal end 85b of the pivot bar 85. Thus, the hollow cylindrical sleeve 64, the pivot bar 85, the bridge 74 and the lever 70 are connected together to form an integral unit that moves together as one. Accordingly, as the hollow cylindrical sleeve 64 rotates about the axle 65, the pivot bar 85, the bridge 74 and the lever 70 also move. Similarly, movement of the lever 70 effects rotational movement of the hollow cylindrical sleeve 64, which effects a pivoting movement of the arm 60 and the locking paw 84 that is attached at the proximal end 60a of the arm 60. The weight of the release lever 70 attached at the distal end 85d of the pivot bar 85 acts to further bias the proximal end 85a carrying the locking paw 84 in an orientation that serves to bias the locking paw 84 resting in one of the nadirs 82d of the linear index rail 82 to restrain any shortening of the length of the linear locking mechanism 80.

Figure 10:
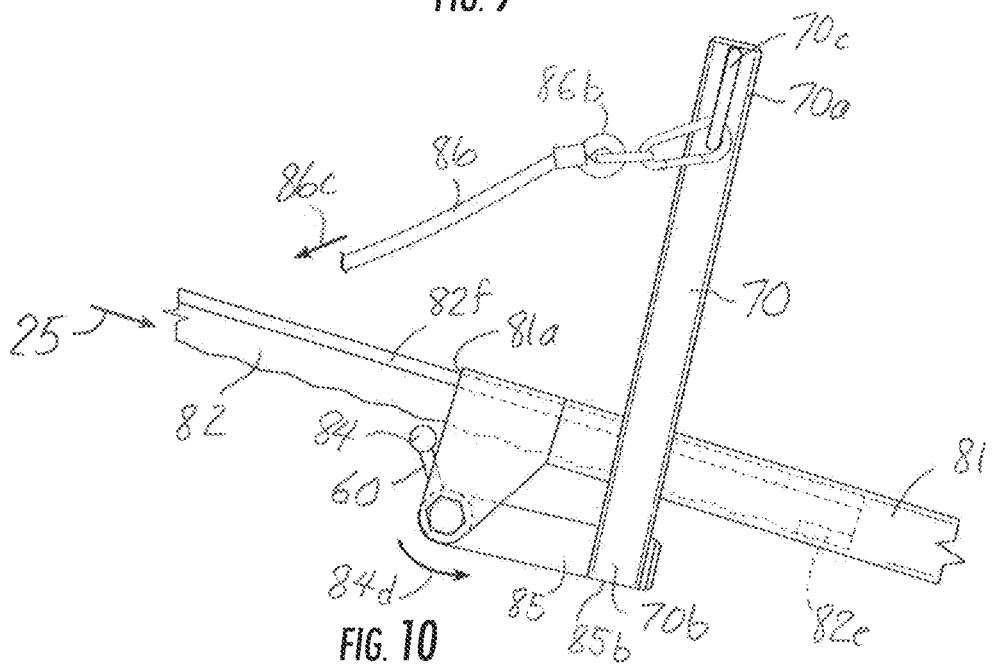
FIG. 10 is a side plan view of the embodiments shown in FIG. 8 with the lifting resistance device disengaged to release the gangway so that the gangway can be retracted and eventually disposed in the storage orientation shown in FIG. 7 for example.

As schematically shown in FIGS. 9 and 10 for example, the length of the release lever 70 desirably extends at a right angle with respect to the length of the pivot bar 85. Moreover, as schematically shown in FIGS. 3 and 4 for example, the bridge 74 serves to displace to a location that is to the exterior of the gangway 30, the vertical plane in which the release lever 70 rotates. Thus, workers walking up and down the gangway will not encounter the lever 70 and accidentally move the lever 70 while workers are moving on the gangway 30. An embodiment of the lever 70 desirably can be provided by a hollow steel tube measuring ten and one half inches in length and having a square transverse cross section with one inch sides. An embodiment of the bridge 74 desirably can be provided by a hollow steel tube measuring two and one half inches in length and having a square transverse cross section with one inch sides.

As schematically shown in FIGS. 8 and 15 for example, the release mechanism of the lifting resistance device desirably includes a guide 70c, which desirably is a closed circular loop that is carried at the proximal end of the lever 70 and resides parallel to a plane that desirably is disposed normal to the direction of elongation of the lever 70. As schematically shown in the embodiment depicted in FIG. 15 for example, the plane that is parallel to the guide 70c desirably resides transversely with respect to the longitudinal axis of the pivot bar 85, the sheath 81 and the linear index rail 82.

As schematically shown in FIGS. 8 and 15 for example, the release mechanism of the lifting resistance device 80 desirably includes an elongated release cord 86. This release cord 86 is extended along a path that is guided between the gangway 30 and the lifting resistance device 80 in a manner that permits the user to release the retention mechanism while the user is physically located on the platform 22 (FIGS. 1 and 2) near the proximal end 30a of the gangway 30.

As schematically shown in FIG. 4 for example, a post 31c that desirably is disposed near the upper end 31a of the first proximal upright 31 is available as a location where usually a proximal end 86a of the release cord 86 desirably can be tied off after leaving enough slack in the release cord 86 to allow the full extension of the gangway 30 to the position of the gangway 30 shown for example in FIG. 2. As schematically shown in FIG. 3 for example, the distal end 86b of the elongated release cord 86 is spaced apart from the proximal end 86a and anchored to the guide 70c at the proximal end of the lever 70. Indeed, as schematically shown in FIG. 8 for example, the distal end 86b of the elongated release cord 86 desirably is anchored by a manually detachable clip that is pivotally connected to the guide 70c at the proximal end of the lever 70. Thus, when the user pulls on the guide cord 86 toward the proximal end 30a of the gangway 30, the proximal end 70a of the lever 70 likewise is pulled toward the proximal end 30a of the gangway 30 and in so doing causes the locking paw 84 to disengage from the linear index rail 82, thereby allowing the linear index rail 82 to move into the sheath 81 and thus shorten the overall length of the linear locking mechanism 80.

Thus, as schematically shown in FIGS. 1-7 for example, upon grasping the proximal end 86a of this release cord 86 that is located near the proximal end 30a of the gangway 30, the user can pull on the proximal end 86a of the release cord 86 and thereby disengage the locking paw 84 from the linear index rail 82 to enable the linear index rail 82 to be slid into the hollow interior of the sheath 81 as schematically shown by the direction of the straight arrow 25 in FIG. 10 for example, as the gangway 30 is pulled away from the top 13a of the tank 13 shown in FIGS. 1 and 2.

Figure 11:
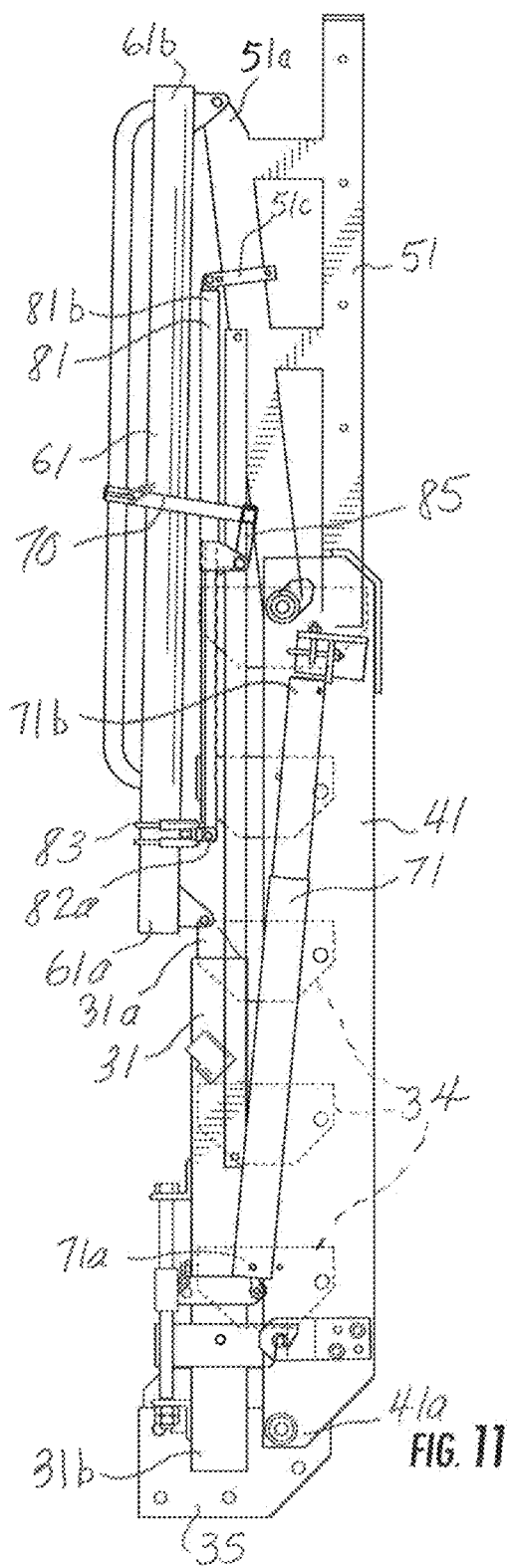
FIG. 11 is a side plan view taken from the outside of the embodiments shown in FIG. 7 but disposed in the fully retracted orientation with the stringers of the gangway maximally collapsed near the respective midrails.

As the gangway 30 is rotated from the maximally stored position shown in FIG. 11 for example toward a partially stored orientation shown in FIG. 7 and thence to a partially operative configuration shown in FIG. 5 and thence to an operative configuration resting on the top 13a of the tank 13 such as shown in FIGS. 2 and 6 for example, the linear index rail 82 would be moving out of the interior of the sheath 81 and away from the sheath 81 in the direction of the straight arrow 23 shown in FIG. 9 for example. The locking paw 84 would move in the direction of the curved arrow 84d shown schematically in FIG. 9 when disengaged with (and thus not in contact with) the vertices 82c and nadirs 82d of the linear index rail 82. With the locking paw 84 engaged against the linear index rail 82, as shown in FIGS. 8, 9, 14 and 15 for example, the linear index rail 82 is restrained from moving either into or out of the hollow interior of the sheath 81 and thus is retained in a stable extended position.

As shown in FIGS. 12-15, the adjustable clamp 83 pivotally attaches the free end of the linear index rail 82 to the first top rail 61, while the distal pivotal attachment bracket 51c pivotally attaches the distal end of the hollow sheath 81 to the first distal upright 51. Thus, when the gangway 30 is deployed on the top 13a of the tank 13 such as shown in FIGS. 2 and 6 for example, the default condition of the lifting resistance device 80 in this restrained condition renders it difficult for a worker who is situated at the distal end 30b of the gangway 30 on the top 13a of the tank 13, to lift the distal end 30b of the gangway 30 away from the top 13a of the tank 13. The lifting resistance device 80 is desirably configured so that in order to lift the distal end 30b of the gangway 30 away from the top 13a of the tank 13, a worker desirably would be required to exert a force that is in a range on the order of fifty pounds of force to one hundred fifty pounds of force. Nevertheless, someone pulling the distal end 30b of the gangway 30 upwardly with this amount of lifting force can overpower the engagement between the locking paw 84 and the linear index rail 82 and thus be able to lift the distal end 30b of the gangway 30 off of the top 13a of the tank 13.

As schematically shown in FIG. 10, disengaging the locking paw 84 from the linear index rail 82 enables the gangway 30 to be lifted away from the top 13a of the tank 13. As schematically shown in FIG. 4 for example, disengagement of the locking paw 84 from the linear index rail 82 without the exertion of significant force by the user only can be effected by the user pulling on the proximal end 86a of the release cord 86 tethered at the post 31c at the proximal end 30a of the gangway 30. When the user tugs on the proximal end 86a of the release cord 86 from the proximal end 30a of the gangway 30 as schematically shown in FIG. 1 for example, the release cord 86 is pulled in the direction of the straight arrow 86c shown schematically in FIG. 10. Because the distal end 86b of the release cord 86 is anchored at the proximal end 70a of the lever 70, the tension on the release cord 86 in the direction of the arrow 86c in FIG. 10 causes the pivot bar 85 to pivot in the direction of the curved arrow 85d schematically shown in FIG. 10 and thus move the locking paw 84 away from contact with the linear index rail 82 and thereby disengage the lifting resistance device 80. Since the gangway 30 is counterbalanced by the spring tubes 71, 72, once the lifting resistance device 80 has been disengaged, continued tugging on the release cord 86 also permits the user to pull up the gangway 30 into the fully stored orientation (FIG. 11) with relatively little effort.

In order to retrofit a pre-existing gangway 30 with a lifting resistance device 80 in accordance with the present invention, it is desirable to position the proximal clamp 83 and the distal pivotal attachment bracket 51c at their respective optimal locations on the first top rail 61 and the first distal upright 51. The installer desirably would begin by rigidly attaching the distal pivotal attachment bracket 51c to the first distal upright 51 and then loosely mounting the proximal clamp 83 on the first top rail 61. Then the installer would fold the gangway 30 up to the fully retracted and collapsed orientation such as shown in FIG. 11. Then the installer would slide the proximal clamp 83 along the first top rail 61 until the linear index rail 82 is disposed as far as the linear index rail 82 will reach into the interior of the sheath 81. Once this position of the proximal clamp 83 has been attained, then the installer would rigidly attach the proximal clamp 83 at that position along the first top rail 61.

As schematically shown in FIG. 4 for example, the distal end 91b of a first chain 91 desirably is attached pivotally to the upper edge of about the midpoint of the first stringer 41. Though not visible in the views shown in the figures, the distal end of a second chain 92 is similarly desirably attached to about the midpoint of the upper edge of the second stringer 42. As schematically shown in FIGS. 3 and 4 for example, the respective proximal ends 91a, 92a of the respective chains 91, 92 desirably are held by a respective chain caddy 93. The respective chains 91, 92 primarily serve to prevent the gangway 30 from being lowered any further once the chains 91, 92 have reached their full extensions.

While at least one presently preferred embodiment of the invention has been described using specific terms, such description is for illustrative purposes only, and it is to be understood that changes and variations may be made without departing from the spirit or scope of the following claims. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A gangway for being connected to a platform that selectively provides worker access to at least a portion of the top of a container disposed above the ground, the gangway being selectively extensible and retractable and comprising:
   a. a proximal end and a distal end extending opposite the proximal end, the proximal end including a first proximal upright and a second proximal upright spaced laterally apart from the first proximal upright, each of these proximal uprights having an upper end and a lower end disposed spaced apart from the upper end, the lower end of each of the proximal uprights being configured for attaching to the platform;
   b. a first stringer and a second stringer, the first stringer being spaced laterally apart from the second stringer, each stringer extending longitudinally between a proximal end and a distal end, the proximal end of the first stringer being pivotally connected to the lower end of the first proximal upright, the proximal end of the second stringer being pivotally connected to the lower end of the second proximal upright;

c. a plurality of steps, each step being disposed spaced apart longitudinally from each other step, each step having a first end pivotally mounted to the first stringer and a second end spaced laterally apart from the first end of the step and pivotally mounted to the second stringer;

d. the distal end of the gangway including a first distal upright and a second distal upright spaced laterally apart from the first distal upright, each distal upright having an upper end and a lower end spaced apart from the upper end, the lower end of the first distal upright being pivotally connected to the distal end of the first stringer, the lower end of the second distal upright being pivotally connected to the distal end of the second stringer;

e. a first top rail extending longitudinally between a proximal end and a distal end, the proximal end of the first top rail being pivotally connected to the upper end of the first proximal upright, the distal end of the first top rail being pivotally connected to the upper end of the first distal upright, a second top rail extending longitudinally between a proximal end and a distal end, the proximal end of the second top rail being pivotally connected to the upper end of the second proximal upright, the distal end of the second top rail being pivotally connected to the upper end of the second distal upright;

f. a first spring tube extending longitudinally between a proximal end and a distal end, the proximal end of the first spring tube being pivotally connected to the first proximal upright, the distal end of the first spring tube being pivotally connected to the distal end of the first stringer, a second spring tube extending longitudinally between a proximal end and a distal end, the proximal end of the second spring tube being pivotally connected to the second proximal upright, the distal end of the second spring tube being pivotally connected to the distal end of the second stringer; and g. a selectively extensible and retractable lifting resistance device having a proximal end and a distal end longitudinally spaced apart from the proximal end, the proximal end of the lifting resistance device being pivotally connected to the first top rail, the distal end of the lifting resistance device being pivotally connected to the first distal upright.

2. The gangway of claim 1, wherein the lifting resistance device includes an elongated sheath that has a hollow interior and defines at one end of the sheath an entrance opening leading into the hollow interior, the lifting resistance device including a linear index rail that is selectively slideable into and out of the hollow interior of the sheath.

3. The gangway of claim 2, further comprising an adjustable clamp that is pivotally connected to the proximal end of the lifting resistance device and selectively adjustably attached to the first top rail, the adjustable clamp being connected at the end of the linear index rail that is spaced farther from where the entrance opening of the sheath is located.

4. The gangway of claim 3, wherein the lifting resistance device includes a locking paw that selectively engages the linear index rail and is pivotally mounted to the sheath near the entrance opening of the sheath.

5. The gangway of claim 4, wherein the locking paw is rotatable between engagement with the linear index rail and disengagement from the linear index rail.

6. The gangway of claim 5, wherein the lifting resistance device includes a pivot bar having a proximal end and a distal end spaced longitudinally apart from the proximal end, which is pivotally connected to the sheath.

7. The gangway of claim 6, wherein the lifting resistance device includes a lever and a guide, the lever having a proximal end and a distal end spaced longitudinally apart from the proximal end, the distal end of the lever is rigidly connected to the distal end of the pivot bar, the guide is mounted to the proximal end of the lever.

8. The gangway of claim 7, wherein the lifting resistance device includes a first flange connected to and depending from the sheath near the entrance opening, the pivot bar being pivotally carried by the first flange.

9. The gangway of claim 7, wherein the lifting resistance device includes an elongated release cord having a proximal end and a distal end spaced apart from the proximal end and anchored to the guide at the proximal end of the lever.

10. The gangway of claim 7, wherein the lifting resistance device includes a bridge having one end fixed to the distal end of the lever and an opposite end fixed to the distal end of the pivot bar and displacing the lever to the exterior of the gangway.

11. The gangway of claim 7, wherein the lifting resistance device includes a hollow cylindrical sleeve attached to the proximal end of the pivot bar and rotatable with respect to the sheath.

12. The gangway of claim 11, wherein the lifting resistance device includes an arm extending longitudinally between the hollow cylindrical sleeve and the locking paw.

13. The gangway of claim 1, wherein the distal end of the lifting resistance device is pivotally connected to the first distal upright at a location that is closer to the upper end of the first distal upright than to the lower end of the first distal upright.

14. A selectively extensible and retractable lifting resistance device that is retrofitable to a gangway, the gangway having a proximal end and a distal end spaced longitudinally apart from the proximal end, the gangway being selectively extensible and retractable in the longitudinal direction, the gangway having at least one spring tube for counterbalancing the weight of the gangway, the gangway having a distal upright pivotally connected at an upper end thereof to a distal end of a top rail of the gangway, the lifting resistance device comprising:

a. an elongated sheath that has a hollow interior and defines at one end of the sheath an entrance opening leading into the hollow interior;

b. a linear index rail that selectively slides into and out of the hollow interior of the sheath;

c. an adjustable clamp that is pivotally connected to the linear index rail and configured for being selectively adjustably attached to the top rail of the gangway, the adjustable clamp being connected at the end of the linear index rail that is opposite the end that first slides into the hollow interior of the sheath;

d. a locking paw that selectively engages the linear index rail and is pivotally mounted to the sheath near the entrance opening of the sheath; and e. a pivot bar having a proximal end and a distal end disposed longitudinally apart from the proximal end, wherein the proximal end of the pivot bar is pivotally connected to the sheath.

15. The lifting resistance device of claim 14, wherein the locking paw is pivotable between engagement with the linear index rail and disengagement from the linear index rail.

16. A selectively extensible and retractable lifting resistance device that is retrofitable to a gangway, the gangway having a proximal end and a distal end spaced longitudinally apart from the proximal end, the gangway being selectively extensible and retractable in the longitudinal direction, the gangway having at least one spring tube for counterbalancing the weight of the gangway, the gangway having a distal upright pivotally connected at an upper end thereof to a distal end of a top rail of the gangway, the lifting resistance device comprising:

a. an elongated sheath that has a hollow interior and defines at one end of the sheath an entrance opening leading into the hollow interior;

b. a linear index rail that selectively slides into and out of the hollow interior of the sheath;

c. an adjustable clamp that is pivotally connected to the linear index rail and configured for being selectively adjustably attached to the top rail of the gangway, the adjustable clamp being connected at the end of the linear index rail that is opposite the end that first slides into the hollow interior of the sheath;

d. a locking paw that selectively engages the linear index rail and is pivotally mounted to the sheath near the entrance opening of the sheath;

e. a pivot bar having a proximal end and a distal end disposed longitudinally apart from the proximal end, wherein the proximal end of the pivot bar is pivotally connected to the sheath; and a lever and a guide, the lever having a proximal end and a distal end spaced longitudinally apart from the proximal end, the distal end of the lever is rigidly connected to the pivot bar, the guide is mounted to the proximal end of the lever.

17. The lifting resistance device of claim 16, further comprising a first flange connected to and depending from the sheath near the entrance opening, the pivot bar being pivotally carried by the first flange.

18. The lifting resistance device of claim 16, further comprising an elongated release cord having a proximal end and a distal end spaced apart from the proximal end and anchored to the guide at the proximal end of the lever.

19. The lifting resistance device of claim 16, further comprising a bridge having one end fixed to the distal end of the lever and an opposite end fixed to the distal end of the pivot bar and displacing the lever transversely away from of the sheath.

20. The lifting resistance device of claim 16, further comprising an arm and a hollow cylindrical sleeve, the hollow cylindrical sleeve being attached to the proximal end of the pivot bar and rotatable with respect to the sheath, the arm extending longitudinally between the hollow cylindrical sleeve and the locking paw.

* * * * *